US012686835B2

(12) United States Patent
Lynch et al.

(10) Patent No.: US 12,686,835 B2
(45) **Date of Patent: *Jul. 21, 2026**

(54) LOW-WATER COMPOSITIONS

(71) Applicant: The Procter & Gamble Company, Cincinnati, OH (US)

(72) Inventors: Matthew Lawrence Lynch, Mariemont, OH (US); Brandon Philip Illie, Felicity, OH (US); Kristin Rhedrick Williams, West Chester, OH (US); Jocelyn Michelle McCullough, Loveland, OH (US); Vighter Iberi, Mason, OH (US); Karen Diana Hufford, Amelia, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 353 days.

This patent is subject to a terminal disclaimer.

(21) Appl. No.: 18/366,710

(22) Filed: Aug. 8, 2023

(65) Prior Publication Data

US 2024/0060002 A1 Feb. 22, 2024

Related U.S. Application Data

(60) Provisional application No. 63/397,403, filed on Aug. 12, 2022.

(51) Int. Cl.

| | |
|---|---|
| ***C11D 1/04*** | (2006.01) |
| ***C11D 3/20*** | (2006.01) |
| ***C11D 3/50*** | (2006.01) |
| ***C11D 11/00*** | (2006.01) |
| ***C11D 17/06*** | (2006.01) |

(52) U.S. Cl.

CPC .............. *C11D 1/04* (2013.01); *C11D 3/2068* (2013.01); *C11D 3/505* (2013.01); *C11D 11/0082* (2013.01); *C11D 17/065* (2013.01); *C11D 2111/12* (2024.01)

(58) Field of Classification Search

CPC ......... C11D 1/04; C11D 3/2068; C11D 3/505; C11D 11/0082; C11D 17/065; C11D 2111/12

See application file for complete search history.

(56) References Cited

U.S. PATENT DOCUMENTS

| | | |
|---|---|---|
| 3,043,778 A | 7/1962 | Kelly |
| 4,285,826 A | 8/1981 | Bertozzi et al. |

(Continued)

FOREIGN PATENT DOCUMENTS

| | | | |
|---|---|---|---|
| CA | 3035448 A1 * | 3/2018 | ............... C11D 1/22 |
| EP | 3282003 A1 * | 2/2018 | ........... C11D 3/3707 |

(Continued)

OTHER PUBLICATIONS

All Office Actions; U.S. Appl. No. 18/366,709, filed Aug. 8, 2023.

(Continued)

*Primary Examiner* — Angela C Brown-Pettigrew
*Assistant Examiner* — Brittany Sharon Harris
(74) *Attorney, Agent, or Firm* — Carolyn S. Powell; James E. Oehlenschlager

(57) ABSTRACT

A low-water composition comprising a solid dissolvable composition domain having a crystallizing agent and a PEGC domain.

18 Claims, 8 Drawing Sheets

(56) References Cited

U.S. PATENT DOCUMENTS

| | | | | |
|---|---|---|---|---|
| 5,340,492 | A | 8/1994 | Kacher et al. | |
| 5,540,852 | A | 7/1996 | Kefauver et al. | |
| 6,221,829 | B1 | 4/2001 | Symes | |
| 6,562,769 | B1 | 5/2003 | Paatz et al. | |
| 6,825,161 | B2 | 11/2004 | Shefer et al. | |
| 8,389,462 | B2 | 3/2013 | Janszen et al. | |
| 8,754,028 | B2 | 6/2014 | Velazquez | |
| 10,144,903 | B2 | 12/2018 | Amorelli et al. | |
| 11,834,630 | B2 | 12/2023 | Brooker et al. | |
| 2002/0045555 | A1* | 4/2002 | Andreas | C11D 9/18 510/141 |
| 2004/0097387 | A1 | 5/2004 | Taylor et al. | |
| 2005/0003975 | A1 | 1/2005 | Browne et al. | |
| 2009/0286706 | A1 | 11/2009 | Chakrabarty et al. | |
| 2012/0028874 | A1 | 2/2012 | Fernandez et al. | |
| 2013/0217609 | A1 | 8/2013 | Fernandes et al. | |
| 2013/0281343 | A1 | 10/2013 | Astolfi et al. | |
| 2014/0179587 | A1 | 6/2014 | Brown et al. | |
| 2016/0040096 | A1 | 2/2016 | Smets et al. | |
| 2016/0354504 | A1 | 12/2016 | Sasaki | |
| 2019/0169542 | A1 | 6/2019 | Frankenbach et al. | |
| 2019/0169549 | A1 | 6/2019 | Deflorian | |
| 2019/0276387 | A1 | 9/2019 | Flachsmann | |
| 2020/0095267 | A1 | 3/2020 | Panandiker et al. | |
| 2020/0330948 | A1 | 10/2020 | Cardoso et al. | |
| 2020/0330949 | A1 | 10/2020 | Cardoso et al. | |
| 2020/0406218 | A1 | 12/2020 | Berthier et al. | |
| 2021/0277327 | A1 | 9/2021 | Panandiker et al. | |
| 2021/0315783 | A1 | 10/2021 | Lynch et al. | |
| 2021/0315812 | A1 | 10/2021 | Lynch et al. | |
| 2021/0339217 | A1 | 11/2021 | Feng | |
| 2022/0010245 | A1 | 1/2022 | Lynch et al. | |
| 2022/0098528 | A1 | 3/2022 | Agarkhed et al. | |
| 2022/0118287 | A1 | 4/2022 | Cetti et al. | |
| 2022/0118417 | A1 | 4/2022 | Smith et al. | |
| 2022/0119743 | A1 | 4/2022 | Barros et al. | |
| 2022/0177813 | A1 | 6/2022 | Natoli et al. | |
| 2024/0060013 | A1 | 2/2024 | Lynch | |
| 2024/0252682 | A1 | 8/2024 | Altshuler et al. | |
| 2024/0372208 | A1 | 11/2024 | Jang et al. | |

FOREIGN PATENT DOCUMENTS

| | | | | |
|---|---|---|---|---|
| EP | 3459622 | A1 | 3/2019 | |
| EP | 3233200 | B1 | 9/2021 | |
| JP | S63248899 | A | 10/1988 | |
| JP | 2003064400 | A | 3/2003 | |
| JP | 2004331592 | A | 11/2004 | |
| JP | 2014213072 | A | 11/2014 | |
| WO | 9209679 | A1 | 6/1992 | |
| WO | 9216610 | A1 | 10/1992 | |
| WO | 2014037167 | A1 | 3/2014 | |
| WO | 2020260598 | A1 | 12/2020 | |
| WO | WO-2021123018 | A1 * | 6/2021 | C11D 9/16 |
| WO | 2021207440 | A1 | 10/2021 | |
| WO | 2022017888 | A1 | 1/2022 | |
| WO | 2022122878 | A1 | 6/2022 | |

OTHER PUBLICATIONS

All Office Actions; U.S. Appl. No. 18/366,712, filed Aug. 8, 2023.
All Office Actions; U.S. Appl. No. 18/366,713, filed Aug. 8, 2023.
All Office Actions; U.S. Appl. No. 18/366,714, filed Aug. 8, 2023.
All Office Actions; U.S. Appl. No. 18/366,715, filed Aug. 8, 2023.
All Office Actions; U.S. Appl. No. 18/366,717, filed Aug. 8, 2023.
All Office Actions; U.S. Appl. No. 18/366,719, filed Aug. 8, 2023.
All Office Actions; U.S. Appl. No. 18/366,730, filed Aug. 8, 2023.
All Office Actions; U.S. Appl. No. 18/366,736, filed Aug. 8, 2023.
Unpublished U.S. Appl. No. 18/366,709, filed Aug. 8, 2023, to Matthew Lawrence Lynch et. al.
Unpublished U.S. Appl. No. 18/366,712, filed Aug. 8, 2023, to Matthew Lawrence Lynch et. al.
Unpublished U.S. Appl. No. 18/366,713, filed Aug. 8, 2023, to Matthew Lawrence Lynch et. al.
Unpublished U.S. Appl. No. 18/366,714, filed Aug. 8, 2023, to Matthew Lawrence Lynch et. al.
Unpublished U.S. Appl. No. 18/366,715, filed Aug. 8, 2023, to Matthew Lawrence Lynch et. al.
Unpublished U.S. Appl. No. 18/366,717, filed Aug. 8, 2023, to Matthew Lawrence Lynch et. al.
Unpublished U.S. Appl. No. 18/366,719, filed Aug. 8, 2023, to Matthew Lawrence Lynch et. al.
Unpublished U.S. Appl. No. 18/366,730, filed Aug. 8, 2023, to Matthew Lawrence Lynch et. al.
Unpublished U.S. Appl. No. 18/366,736, filed Aug. 8, 2023, to Matthew Lawrence Lynch et. al.
"Standard For Named Vegetable Oils: Codex Alimentarius", Retrieved from: https://www.fao.org/fao-who-codexalimentarius/sh-proxy/en/?lnk=1&url=https%253A%252F%252Fworkspace.fao.org%252Fsites%252Fcodex%252FStandards%252FCXS%28210-1999%252FCXS_210e.pdf, Dec. 31, 2019, 15 Pages.
PCT Search Report and Written Opinion for PCT/US2023/071803 dated Nov. 28, 2023, 13 pages.

* cited by examiner

25°C

4°C

LOW-WATER COMPOSITIONS

FIELD OF THE INVENTION

Low-water compositions comprising solid dissolvable composition (SDC) domains having a mesh microstructure formed from dry sodium fatty acid carboxylate formulations, polyethylene glycol domains (PEGC), and freshness benefit agent(s) that dissolve during normal use to deliver extraordinary freshness to fabrics.

BACKGROUND OF THE INVENTION

Freshness beads are directly added to the washer drum to deliver freshness to the wash cycle. In the most basic design, the beads are composed of a 'primary' carrier (e.g., PEG, different molecular weight) and freshness benefit agent (e.g., perfume capsules, neat perfumes) to deliver a freshness benefit. Suitable base compositions are disclosed, for example, in U.S. Pat. No. 8,476,219 B2. In the more sophisticated designs, the beads are also composed of one or more 'secondary' carriers (often called fillers), which are dispersed in a primary carrier, to fill one or more specific function in the beads. For example, in one disclosure (U.S. Pat. No. 9,347,022 B1), starch granules are added to the PEG in a bead to reduce the cost of the bead. In another disclosure (WO 2021/170759 A1), polymers, inorganic salts, clays, saccharides, polysaccharides, glycerol, and fatty alcohols are added to facilitate processing and to enhance stability. In still further examples, beads are composed of 'primary' carriers including salt and sugar, sodium acetate trihydrate and block copolymer as disclosed in U.S. Pat. Nos. 11,008,535 B2, 11,220,657 B2, and 10,683,475 B2 respectively.

The formulation of effective solid dissolvable compositions presents a considerable challenge. The compositions need to be physically stable, and preferably temperature resistant and humidity resistant, yet still be able to perform the desired function by dissolving in solution and leaving little or no material behind. Solid dissolvable compositions are well known in the art and have been used in several roles, such as detergents, oral and body medications, disinfectants, and cleaning compositions.

It is surprising that one can create a solid dissolvable composition (SDC) having a mesh microstructure formed from dry sodium fatty acid carboxylate that can comprise high levels of active, that readily solubilizes in water during laundry wash conditions, yet is temperature and humidity resistant, allowing for supply chain stability. It was discovered that low-water compositions having both PEGC and SDC domains provides significant advantages over current freshness beads including solubility rate enhancement, sustainability, broadened fragrance palette, moisture control, greater sourcing opportunities, cost reduction, light-weighting for efficient e-commerce transport, and protection of incompatible chemistries.

SUMMARY OF THE INVENTION

A low-water composition that comprises at least one solid dissolvable composition domain (SDC) having crystallizing agent; at least one polyethylene glycol (PEGC) domain; freshness benefit agent; and wherein the crystallizing agent is the sodium salt of saturated fatty acids having from 8 to about 12 carbon atoms; wherein the freshness benefit agent is present in at least one of the SDC or PEGC.

A low-water composition is provided which substantially dissolves during normal use to deliver extraordinary freshness to fabrics, and is composed of a solid dissolvable composition (SDC) domain made from crystallizing agent; a polyethylene glycol (PEGC) domain; and water; wherein the crystallizing agent is sodium fatty acid carboxylate having from 8 to about 12 carbon atoms; wherein the amount of water is less than 10 wt % of the final low-water composition as determine by the MOISTURE TEST METHOD.

A method of producing a low-water composition is provided that comprises mixing-heating crystallizing agent(s) and the aqueous phase until the crystallizing agent is substantially solubilized, cooling to a temperature before significant crystallization of the crystallizing agent in the form of SDCM; forming—the SDC into the designed shape and size, by cooling the Solid Dissolvable Composition Mixture to below the Crystallization Temperature, and allowing the Solid Dissolvable Composition Mixture to crystallize into an intermediate rheological solid; drying—removing excess water and producing a solid dissolvable composition (SDC) by removing between about 90% to about 99% of the water as determined by the MOISTURE TEST METHOD from the intermediate rheological solid composition to produce a solid dissolvable composition having an average solubility percent greater than 5% at 37° C., as determined by the DISSOLUTION TEST METHOD; providing polyethylene glycol (PEGC); combining the SDC and PEGC to produce a low-water composition having an SDC Domain and a PEGC Domain; wherein a freshness benefit agent is added to at least one of the SDC Domain or the PEGC Domain.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of elements in any of the exemplary embodiments, except as may be explicitly delineated in the corresponding written description. None of the drawings are necessarily to scale.

DETAILED DESCRIPTION OF THE INVENTION

Figure 1A:
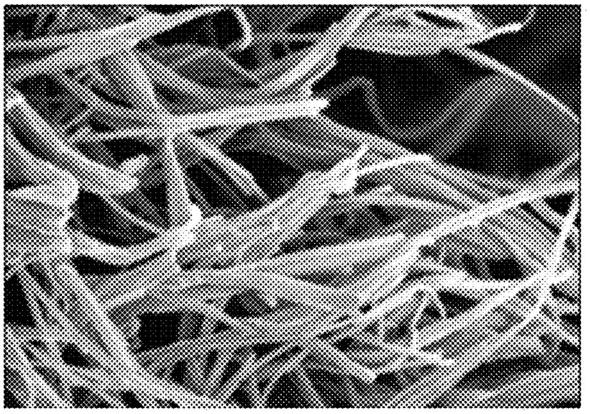
FIG. 1A shows Scanning Electron Micrographs (SEMs) of crystallization agent crystals.

The present invention includes low-water compositions that substantially to completely dissolve in a laundry wash cycle to deliver extraordinary freshness to fabrics. The low-water compositions include at least one domain of solid dissolvable composition (SDC) comprising a crystalline mesh, at least one domain of polyethylene glycol composition (PEGC), and in embodiments one or more freshness benefit agents, which may be at high levels. The crystalline mesh ("mesh") comprises a relatively rigid, three-dimensional, interlocking skeleton framework of fiber-like crystals formed during processing with the crystallizing agents. The solid dissolvable compositions of the present invention have crystallizing agent(s), a low water content, freshness benefit agent(s), and are easily dissolvable at target wash temperatures.

The present invention may be understood more readily by reference to the following detailed description of illustrative compositions. It should be understood that the scope of the claims is not limited to the specific products, methods, conditions, devices, or parameters described herein, and that the terminology used herein is not intended to be limiting of the claimed invention.

"Solid Dissolvable Composition" (SDC), as used herein comprises crystallizing agents of sodium fatty acid carboxylate, which when processed correctly, form an interconnected crystalline mesh of fibers that readily dissolve at target wash temperatures, optional freshness benefit agent, and 10 wt % or less of the water present during an initial mixing stage in the form of a solid particle.

"PEG Composition" (PEGC), as used herein comprises PEG and optional freshness benefit agent.

"Domain", as used herein means a contiguous mass that comprises substantially the same material. In one embodiment, a domain may comprise SDC; in another embodiment a domain may comprise PEGC.

"Low-Water Composition", as used herein means a freshness composition that comprises both SDC and PEGC domains, freshness benefit agent and, wherein the low water composition has a water content less than about 10 wt %.

"Consumer product", herein contains a low-water composition purchased to impart freshness to fabric during a wash cycle, having single or many particles which are added to a washer drum before or during a rinse or wash cycle to impart superior freshness to fabrics. Such products include—but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such products may be used as a pre-laundering treatment, and post-laundering treatment.

"Particle", as used herein means a discrete mass (or chunk) in a low-water composition, typically greater than about 5 mg in mass and larger than 1 mm in size. The particles may have different shapes including, but not limited to hemi-sphere, sphere, plate, gummy bear, and cashew. The particles may have one or more domains.

"Solid Dissolvable Composition Mixture" (SDCM), as used herein comprises the components of a solid dissolvable composition prior to water removal (for example, during the mixture stage or crystallization stage). To produce the solid dissolvable composition the intermediate solid dissolvable composition mixture is formed first that comprises an aqueous phase, comprising an aqueous carrier. The aqueous carrier may be distilled, deionized, or tap water. The aqueous carrier may be present in an amount of about 65 wt % to 99.5 wt %, alternatively about 65 wt % to about 90 wt %, alternatively about 70 wt % to about 85 wt %, alternatively about 75 wt %, by weight of the SDCM.

"Rheological Solid Composition" (RSC), as used herein describes the solid form of the SDCM after the crystallization (crystallization stage) before water removal to give an SDC, wherein the RSC comprises greater than about 65 wt % water, and the solid form is from the 'structured' mesh of interlocking (mesh microstructure), fiber-like crystalline particles from the crystallizing agent.

"PEG", as used herein comprises polyethylene glycol (PEG), with molecular weight from about 200 to about 50,000 Daltons, most preferably between about 6,000 and 10,000 Daltons.

"Freshness benefit agent", as used herein and further described below, includes material added to a domain to impart freshness benefits to fabric through a wash. In embodiments, a freshness benefit agent may be a neat perfume; in embodiments, a freshness benefit agent may be an encapsulated perfume (perfume capsule); in embodiments, a freshness benefit agent may be a mixture of perfume and/or perfume capsules.

"Crystallization Temperature", as used herein to describe the temperature at which a crystallizing agent (or combination of crystallizing agents) are completely solubilized in the SDCM; alternatively, herein to describe the temperature at which a crystallizing agent (or combination of crystallizing agents) show any crystallization in the SDCM.

"Dissolution Temperature", as used herein to describe the temperature at which a low-water composition is completely solubilized in water under normal wash conditions.

"Stability Temperature", as used herein is the temperature at which most (or all) of the SDC and/or PEGC domain material(s) completely melts, such that a composition no longer exhibits a stable solid structure and may be considered a liquid or paste, and the low-water composition no longer functions as intended. The stability temperature is the lowest temperature thermal transition, as determined by the THERMAL STABILITY TEST METHOD. In embodiments of the present invention the stability temperature may be greater than about 40° C., more preferably greater than about 50° C., more preferably greater than about 60° C., and most preferably greater than about 70° C., to ensure stability in the supply chain. One skilled in the art understands how to measure the lowest thermal transition with a Differential Scanning Calorimetry (DSC) instrument.

"Humidity Stability", as used herein is the relative humidity at which the low water composition spontaneously absorbs more than 5 wt % of the original mass in water from the humidity from the surrounding environment, at 25° C. Water absorption may occur in either the SDC and/or PEGC domains. Absorbing low amounts of water when exposed to humid environments enables more sustainable packaging. Absorbing high amounts of water risks softening or liquifying the composition, such that it no longer functions as intended. In embodiments of the present invention the humidity stability may be above 70% RH, more preferably above 80% RH, more preferably above 90% RH, the most preferably above 95% RH. One skilled in the art understands how to measure 5% weight gain with a Dynamic Vapor Sorption (DVS) instrument, further described in the HUMIDITY TEST METHOD.

"Cleaning composition", as used herein includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including the various pouches, tablet, granular, liquid and rinse-aid types for household and institutional use; liquid cleaning and disinfecting agents, including antibacterial hand-wash types, cleaning bars, mouthwashes, denture cleaners, dentifrice, car or carpet shampoos, bathroom cleaners; hair shampoos and hair-rinses; shower gels and foam baths and metal cleaners; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists.

"Dissolve during normal use", as used herein means that the low-water composition completely or substantially dissolves during the wash cycle. One skilled in the art recognizes that washing cycles have a broad range of conditions (e.g., cycle times, machine types, wash solution compositions, temperatures). Suitable compositions completely or substantially dissolve in at least at one of these conditions.

As used herein, the term "bio-based" material refers to a renewable material.

As used herein, the term "renewable material" refers to a material that is produced from a renewable resource. As used herein, the term "renewable resource" refers to a resource that is produced via a natural process at a rate comparable to its rate of consumption (e.g., within a 100-year time frame). The resource can be replenished naturally, or via agricultural techniques. Non-limiting examples of renewable resources include plants (e.g., sugar cane, beets, corn, potatoes, citrus fruit, woody plants, lignocellulose, hemicellulose, cellulosic waste), animals, fish, bacteria, fungi, and forestry products. These resources can be naturally occurring, hybrids, or genetically engineered organisms. Natural resources, such as crude oil, coal, natural gas, and peat, which take longer than 100 years to form, are not considered renewable resources. Because at least part of the material of the invention is derived from a renewable resource, which can sequester carbon dioxide, use of the material can reduce global warming potential and fossil fuel consumption.

As used herein, the term "bio-based content" refers to the amount of carbon from a renewable resource in a material as a percent of the weight (mass) of the total organic carbon in the material, as determined by ASTM D6866-10 Method B.

The term "solid" refers to the state of the composition under the expected conditions of storage and use of the low-water composition.

As used herein, the articles including "a" and "an" when used in a claim, are understood to mean one or more of what is claimed or described.

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Figure 1B:
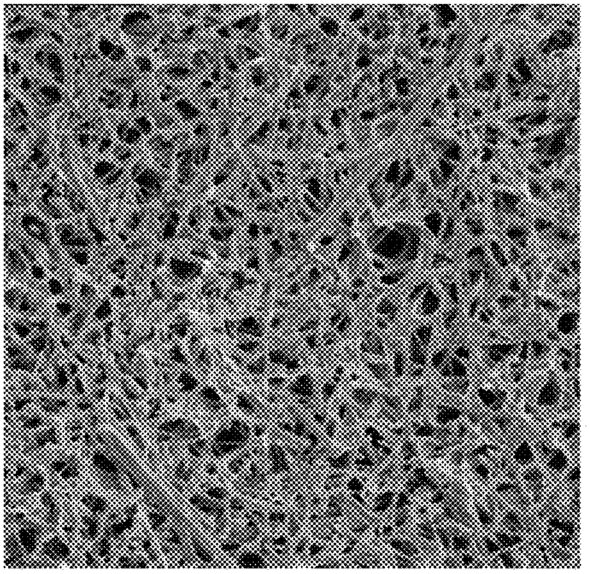
FIG. 1B shows Scanning Electron Micrographs (SEMs) of mesh microstructure made from crystallized crystallization agent, in the SDC domains.
Figure 2A:
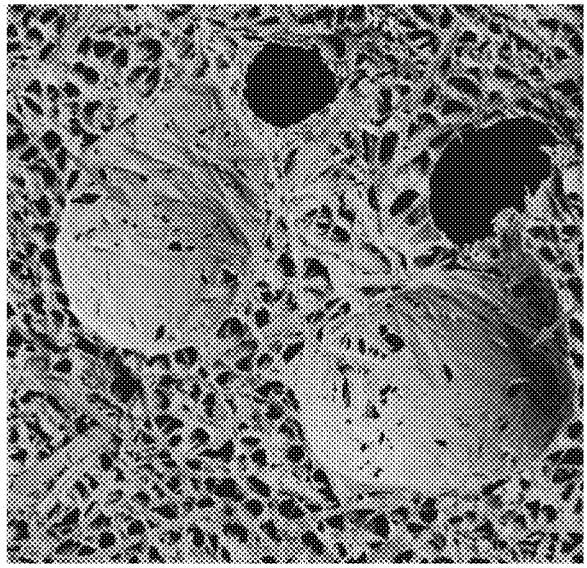
FIG. 2A shows Scanning Electron Micrographs (SEMs) of viable perfume capsules (e.g., red arrow, top) dispersed in the mesh microstructure of the SDC domains.
Figure 2B:
FIG. 2B shows Scanning Electron Micrographs (SEMs), of perfume capsules dispersed in the mesh microstructure of the SDC domains.

The solid dissolvable compositions (SDC) comprise fibrous interlocking crystals (FIGS. 1A and 1B) with sufficient crystal fiber length and concentration to form a mesh microstructure. The mesh allows the SDC to be solid, with a relatively small amount of material. The mesh also allows the entrapment and protection of particulate freshness benefits agents, such as perfume capsules (FIGS. 2A and 2B). In embodiments, an active is a discrete particle have a diameter of less than 100 μms, preferably less than 50 μms and more preferably less than 25 μms. Further, the significant voids in the mesh microstructure also allows the inclusion of liquid freshness benefits agents, such as neat perfumes. In embodiments, one can preferably add up to about 15 wt % neat perfume, preferably between 13 wt % and 0.5 wt %, preferably between 13 wt % and 2 wt %, most preferably between 10 wt % and 2 wt %. The voids also provide a pathway for water to entrain into the microstructure during washing to speed the dissolution relative to completely solid compositions.

It is surprising that it is possible to prepare SDC that have high dissolution rates, low water content, humidity resistance, and thermal stability. Sodium salts of long chain length fatty acids (i.e., sodium myristate (NaC14) to sodium stearate (NaC18) can form fibrous crystals. It is generally understood that the crystal growth patterns leading to a fibrous crystal habit reflect the hydrophilic (head group) and hydrophobic (hydrocarbon chain) balance of the NaC14-NaC18 molecules. As disclosed in this application, while the crystallizing agents used have the same hydrophilic contribution, they have extraordinarily different hydrophobic character owing to the shorter hydrocarbon chains of the employed sodium fatty acid carboxylates. In fact, carbon chains are about one-half the length of those previous disclosed (US2021/0315783A1). Further, one skilled in the art recognizes that many surfactants such as alkyl sulfates are subject to significant uptake of humidity and subject to significant temperature induced changes, having the same chains but different head groups. The select group of crystallizing agents in this invention enables all these useful properties.

Figure 3:
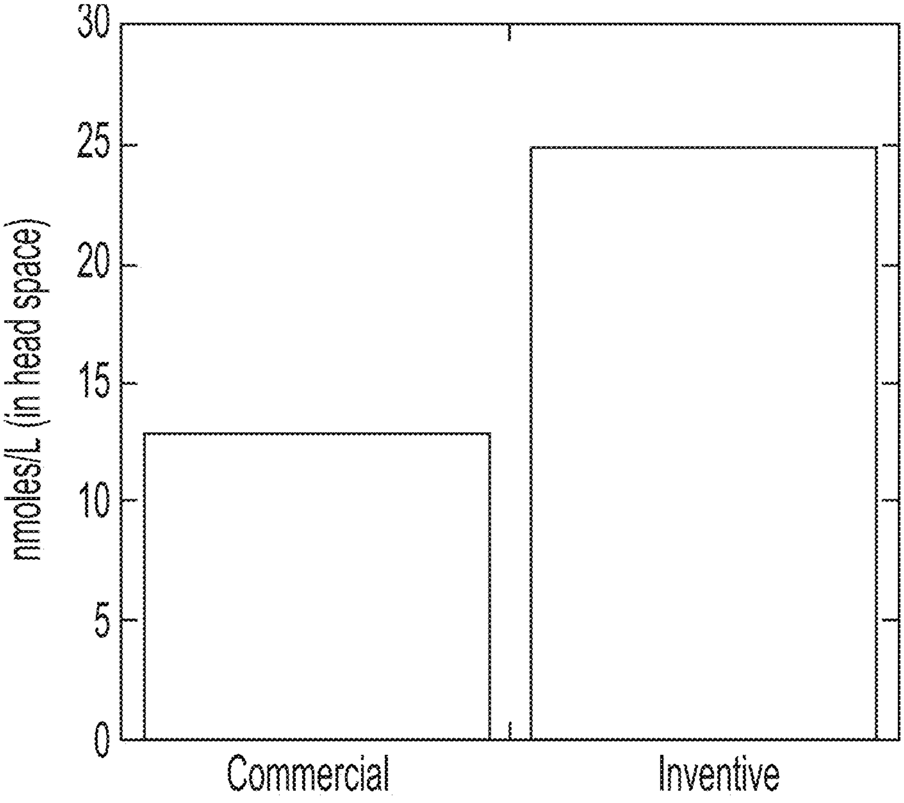
FIG. 3 is a graph showing quantity of perfume in the head space above dry, rubbed fabrics treated with the viable amount of commercial product (about 1 gram perfume capsules, heaping cap) versus inventive composition (about 2.5 grams perfume capsules, ½ cap). The inventive composition has much greater amounts of perfume in the air with a much smaller product add to the wash.

Current water-soluble polymers (e.g., PEG alone) present limitations to the use of encapsulated perfumes as a scent booster delivery system. Encapsulated perfumes are delivered in a water-based slurry, and the slurry is limited to 20-30 wt % maximum of encapsulated perfumes, limiting the total amount of encapsulated perfume to about 1.2 wt %. Use of encapsulated perfume levels above these levels prevent the water-soluble carrier from solidifying, thereby limiting encapsulated perfume delivery. The result is that consumers generally underdose the desired amount of freshness just due to limitations on what they can add into the wash. The dissolvable solid compositions of the present invention can structure up to about 18 wt % perfume capsules and yield about 15× fragrance delivery, as compared to current water-soluble polymers. Such high delivery is at least partially enabled by the low water content of the present compositions, which allows a user a significant freshness upgrade versus current commercial fabric freshness beads (FIG. 3).

Figure 4A:
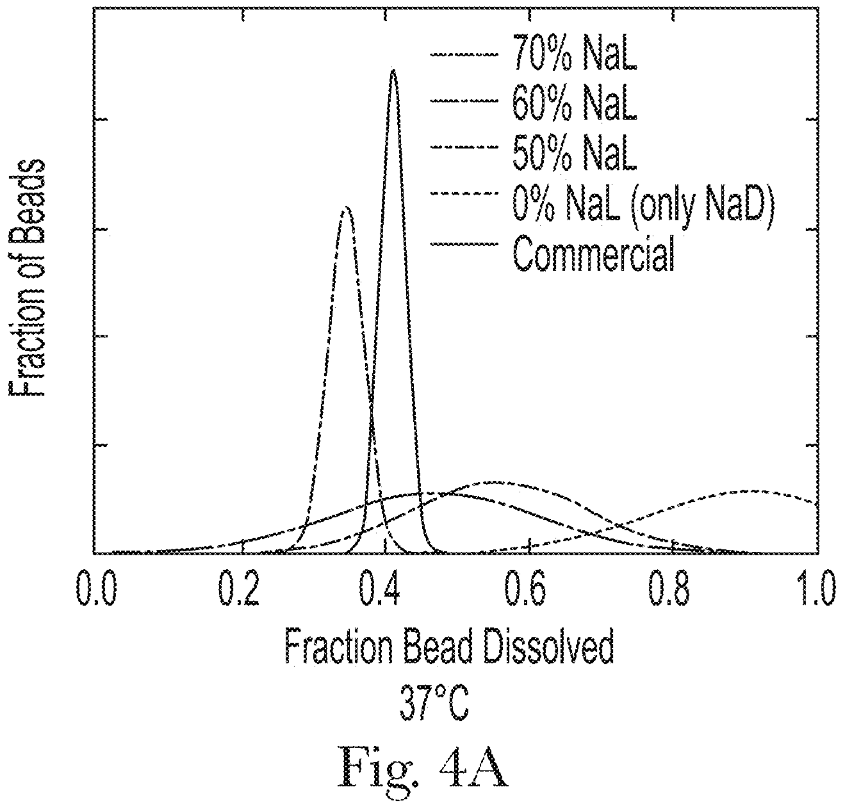
FIGS. 4A, 4B and 4C show dissolution behavior of SDC, prepared with different combinations of crystallizing agents and relative to commercial PEG, as determined using the DISSOLUTION TEST METHOD.
Figure 4B:
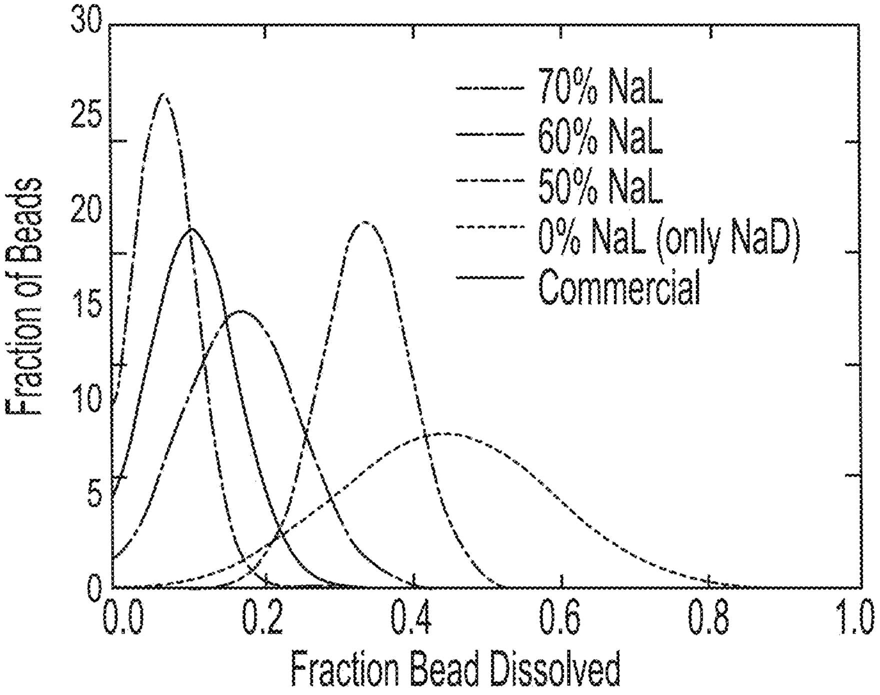
Figure 4C:
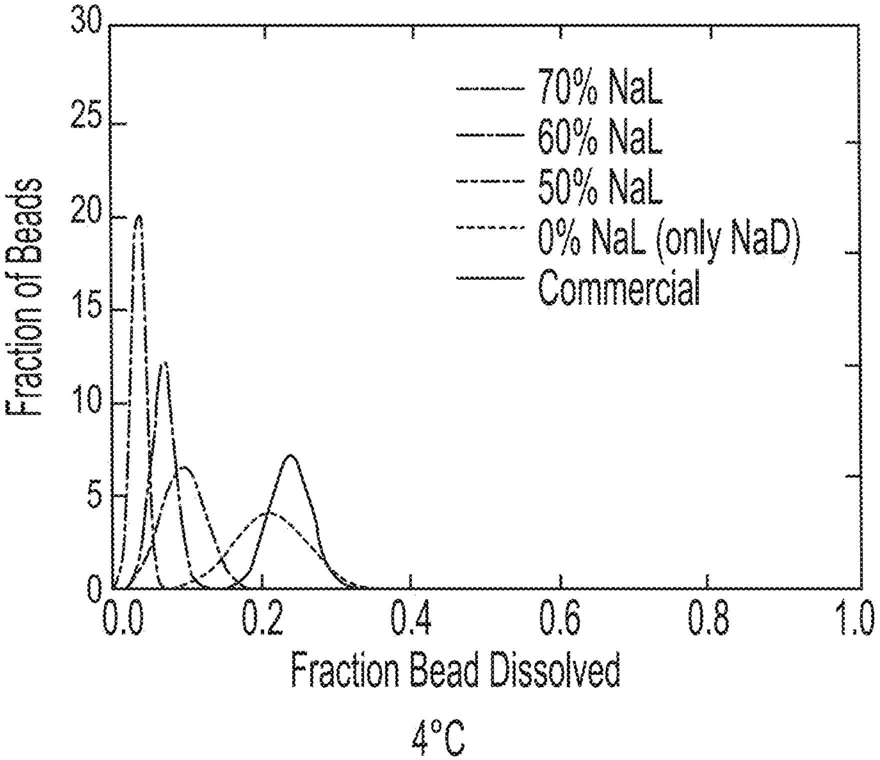

The improved performance of the present inventive compositions as compared to current freshness laundry beads is thought to be linked to the dissolution rate of the compositions' matrix. Without being limited to theory it is believed if the composition dissolves later in the wash cycle, the encapsulated perfumes are more likely to deposit on fabrics through-the-wash (TTW) to enhance freshness performance. Current water-soluble polymers used in commercial fabric freshness beads have limited dissolution rates, set by the limited molecular weight (MW) range of the polyethylene glycol (PEG) used as a dissolution matrix. Consequently, one single bead of PEG must function under a range of machine and wash conditions, limiting performance. In contrast the dissolution rate of the present compositions can be tuned for a range of machine and wash conditions by adjusting the ratio of the composition components (e.g., sodium laurate (NaL) to sodium decanoate (NaD) ratio) (FIG. 4A-FIG. 4C). This allows the opportunity to create a wide range of compositions useful in many differing wash conditions, where SDC domains can release the freshness benefit agents at different times in the wash cycle.

The predominant commercial fabric freshness bead making process limits the selection of freshness benefit agents; instead, domains of the SDC can be processed and added to the low-water compositions. The PEG used to form most current commercial beads must be processed above the melting point of the PEG (between 70° C.-80° C.); preparing SDC domains at room temperature allows for a wider variety of freshness technologies. In practical processes, temperatures at the melting point of the PEG must be maintained for hours, and some perfume raw materials are exceptionally volatile, and will flash off during processing. The inclusion of perfume oil for SDC is done at about 25° C., opening a wide range of addition neat perfume. Further, many perfume capsule wall architectures will fail at the higher process temperatures releasing the encapsulate perfumes and making them ineffective in the low-water composition. Processing in the perfumes capsules at the lower temperature enables a broader range of capsules.

Controlling water migration in mixed bead compositions (e.g., low-water and high-water content beads) is difficult with the current water-soluble polymers used, as water migrates to the surface of high-water content beads. Since the beads are often packaged in an enclosed package that minimizes moisture transmission into and out of the package, trapped moisture on the surface of high-water content beads contacts with the surface of low-water content beads, leading to bead clumping and product dispensing issues. In contrast, the structure of the dissolvable solid compositions prevents water migration, and therefore enables use of materials that are sensitive to water uptake (e.g., cationic polymers, bleaches).

Figure 5:
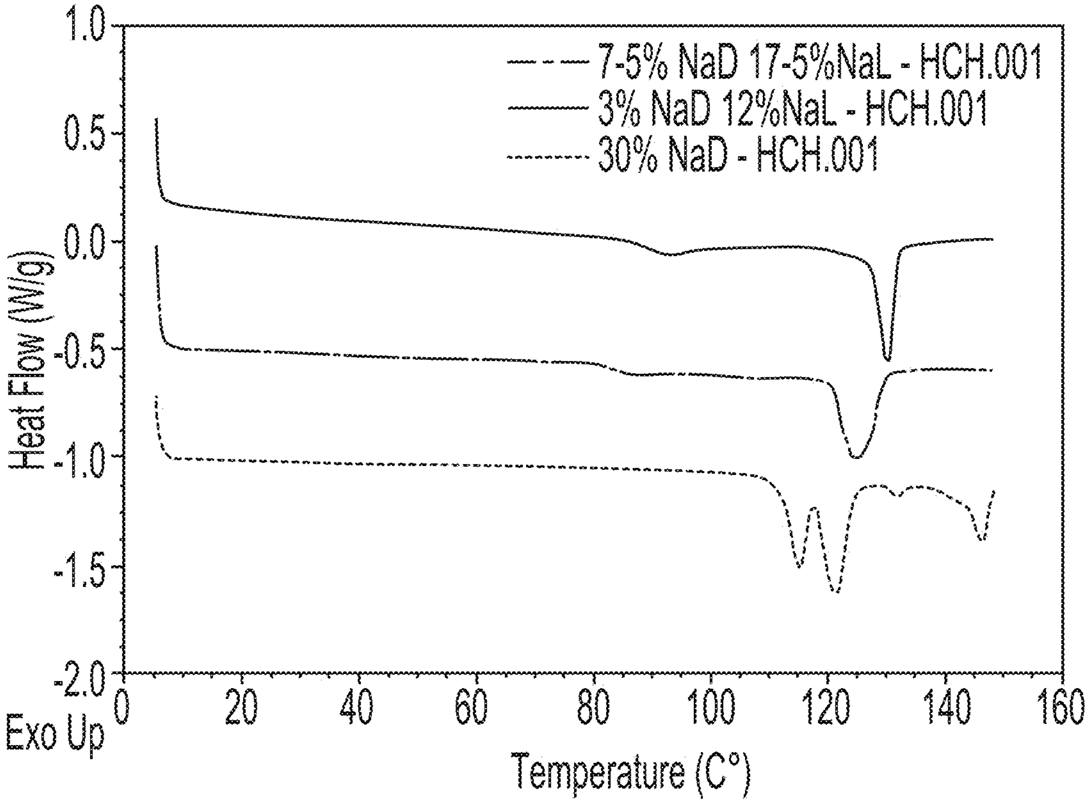
FIG. 5 Is a graph showing measure of the Stability Temperature of the SDC domains for three inventive compositions, using the THERMAL STABILITY TEST METHOD.
Figure 6:
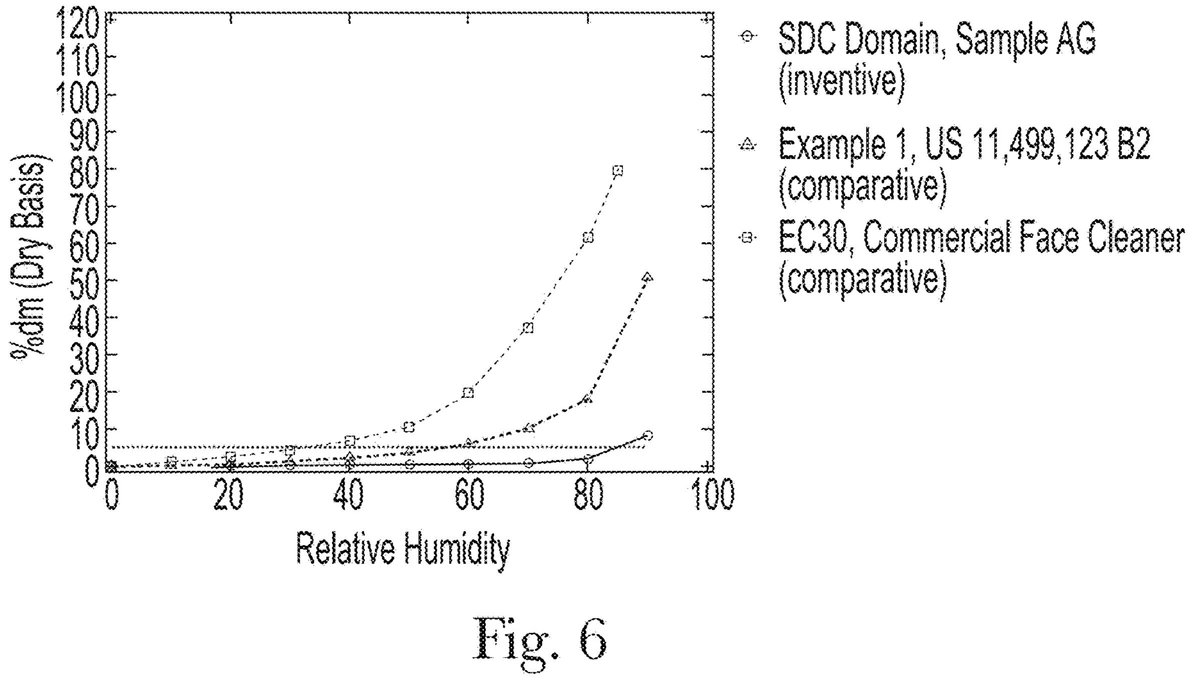
FIG. 6 Is a graph showing hydration stability of inventive and comparative composition SDC domains, by measuring with the HUMIDITY TEST METHOD the uptake of moisture at 25° C., when exposed to different relative humidities.

As discussed previously current bead formulations use PEG (and other structuring materials), are susceptible to degradation when exposed to heat and/or humidity during transit. To mitigate against such degradation special shipping conditions and/or packaging are often thus required. The SDC of the present invention comprises a crystalline structure that is stable in a range of temperature and humidity conditions. The SDC domains preferably show % dm<5% at 70% RH, more preferably % dm<5% at 80% RH and most preferably % dm<5% at 90% RH (FIG. 5) as determined by the HUMIDITY TEST METHOD and essential no melting transitions below 50° C. as determined by the THERMAL STABILITY TEST METHOD (FIG. 6). Consequently, additional resources for refrigeration during shipping and plastic packaging to prevent moisture transfer are not required. Inclusion of the SDC domains in the low-water compositions, enable robust protection of the freshness benefit agents.

Finally, not wishing to be limited to theory, it is believed that the high dissolution rate of the solid dissolvable composition is provided at least in part by the mesh microstructure. This is believed to be important, as it is this porous structure that provides both 'lightness' to the product, and its ability to dissolve rapidly relative to compressed tablets, which allows ready delivery of actives during use. It is believed to be important that a single crystallizing agent (or in combination with other crystallizing agents) form fibers in the solid dissolvable composition making process. The formation of fibers allows solid dissolvable compositions that can retain actives without need for compression, which can break microencapsulates.

In embodiments fibrous crystals may have a minimum length of 10 μm and thickness of 2 μm as determined by the FIBER TEST METHOD. Non-limiting examples of particles are presented in FIG. 7, FIG. 8, FIG. 9, and FIG. 10.

In embodiments actives may be in the form of particles which may be: a) evenly dispersed within the mesh microstructure; b) applied onto the surface of the mesh microstructure; or c) some fraction of the particles being dispersed within the mesh microstructure and some fraction of the particles being applied to the surface of the mesh microstructure. In embodiments actives may be: a) in the form of a soluble film on a top surface of the mesh microstructure; b) in the form of a soluble film on a bottom surface of the mesh microstructure; c) or in the form of a soluble film on both bottom and top surfaces of the mesh. Actives may be present as a combination of soluble films and particles.

Crystallizing Agents

Crystallizing agents selected for their ability to impart different properties on the SDC domains. The crystallizing agents are selected from the small group sodium fatty acid carboxylates having saturated chains and with chain lengths ranging from C8-C12. In this compositional range and with the described method of preparation, such sodium fatty acid carboxylates provide a fibrous mesh microstructure, ideal solubilization temperature for making and dissolution in use, and by suitable blending, the resulting solid dissolvable compositions have tunability in these properties for varied uses and conditions.

Crystallizing agents may be present in Solid Dissolvable Composition Mixtures used to create SDC domains in an amount of from about 5 wt % to about 35 wt %, about 10 wt % to about 35 wt %, or about 15 wt % to about 35 wt %. Crystallizing agents may be present in the SDC domains in an amount of from about 50 wt % to about 99 wt %, about 60 wt % to about 95 wt %, about 70 wt % to about 90 wt %. Crystallizing agents may be present in the low-water composition an amount of from about 5 wt % to about 60 wt %, about 10 wt % to about 50 wt %, about 15 wt % to about 40 wt %.

Suitable crystallizing agents include sodium octanoate (NaC8), sodium decanoate (NaC10), sodium dodecanoate or sodium laurate (NaC12) and combinations thereof.

Capsule Material

A capsule may include a wall material that encapsulates a benefit agent (benefit agent delivery capsule or just "capsule"). Benefit agent may be referred herein as a "benefit agent" or an "encapsulated benefit agent". The encapsulated benefit agent is encapsulated in the core. The benefit agent may be at least one of: a perfume mixture or a malodor counteractant, or combinations thereof. In one aspect, perfume delivery technology may comprise benefit agent delivery capsules formed by at least partially surrounding a benefit agent with a wall material. The benefit agent may include materials selected from the group consisting of perfume raw materials such as 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylpropanal, and 2,6-dimethyl-5-heptenal, alpha-damascone, beta-damascone, gamma-damascone, beta-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl)propyl] cyclopentan-2-one, 2-sec-butylcyclohexanone, and beta-dihydro ionone, linalool, ethyllinalool, tetrahydrolinalool, and dihydromyrcenol; silicone oils, waxes such as polyethylene waxes; essential oils such as fish oils, jasmine, camphor, lavender; skin coolants such as menthol, methyl lactate; vitamins such as Vitamin A and E; sunscreens; glycerine; catalysts such as manganese catalysts or bleach catalysts; bleach particles such as perborates; silicon dioxide particles; antiperspirant actives; cationic polymers and mixtures thereof. Suitable benefit agents can be obtained from Givaudan Corp. of Mount Olive, New Jersey, USA, International Flavors & Fragrances Corp. of South Brunswick, New Jersey, USA, or Firmenich Company of Geneva, Switzerland or Encapsys Company of Appleton, Wisconsin (USA). As used herein, a "perfume raw material" refers to one or more of the following ingredients: fragrant essential oils; aroma compounds; materials supplied with the fragrant essential oils, aroma compounds, stabilizers, diluents, processing agents, and contaminants; and any material that commonly accompanies fragrant essential oils, aroma compounds.

The wall (or shell) material of the benefit agent delivery capsule may comprise: melamine, polyacrylamide, silicones, silica, polystyrene, polyurea, polyurethanes, polyacrylate based materials, polyacrylate esters based materials, gelatin, styrene malic anhydride, polyamides, aromatic alcohols, polyvinyl alcohol and mixtures thereof. The melamine wall material may comprise melamine crosslinked with formaldehyde, melamine-dimethoxyethanol crosslinked with formaldehyde, and mixtures thereof. The polystyrene wall material may comprise polyestyrene cross-linked with divinylbenzene. The polyurea wall material may comprise urea crosslinked with formaldehyde, urea crosslinked with gluteraldehyde, polyisocyanate reacted with a polyamine, a polyamine reacted with an aldehyde and mixtures thereof. The polyacrylate based wall materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof.

The composition may comprise from about 0.05% to about 20%, or from about 0.05% to about 10%, or from about 0.1% to about 5%, or from about 0.2% to about 2%, by weight of the composition, of benefit agent delivery capsules. The composition may comprise a sufficient amount of benefit agent delivery capsules to provide from about 0.05% to about 10%, or from about 0.1% to about 5%, or from about 0.1% to about 2%, by weight of the composition, of the encapsulated benefit agent, which may preferably be perfume raw materials, to the composition. When discussing herein the amount or weight percentage of the benefit agent delivery capsules, it is meant the sum of the wall material and the core material.

The benefit agent delivery capsules according to the present disclosure may be characterized by a volume-weighted median particle size from about 1 to about 100 μm, preferably from about 10 to about 100 μm, preferably from about 15 to about 50 μm, more preferably from about 20 to about 40 μm, even more preferably from about 20 to about 30 μm. Different particle sizes are obtainable by controlling droplet size during emulsification.

The benefit agent delivery capsules may be characterized by a ratio of core to shell up to 99:1, or even 99.5:1, on the basis of weight.

The polyacrylate ester-based wall materials may comprise polyacrylate esters formed by alkyl and/or glycidyl esters of acrylic acid and/or methacrylic acid, acrylic acid esters and/or methacrylic acid esters which carry hydroxyl and/or carboxy groups, and allylgluconamide, and mixtures thereof.

The aromatic alcohol-based wall material may comprise aryloxyalkanols, arylalkanols and oligoalkanolarylethers. It may also comprise aromatic compounds with at least one free hydroxyl-group, especially preferred at least two free hydroxy groups that are directly aromatically coupled, wherein it is especially preferred if at least two free hydroxy-groups are coupled directly to an aromatic ring, and more especially preferred, positioned relative to each other in meta position. It is preferred that the aromatic alcohols are selected from phenols, cresols (o-, m-, and p-cresol), naphthols (alpha and beta-naphthol) and thymol, as well as ethylphenols, propylphenols, fluorphenols and methoxyphenols.

The polyurea based wall material may comprise a polyisocyanate.

The polyvinyl alcohol-based wall material may comprise a crosslinked, hydrophobically modified polyvinyl alcohol, which comprises a crosslinking agent comprising i) a first dextran aldehyde having a molecular weight of from 2,000 to 50,000 Da; and ii) a second dextran aldehyde having a molecular weight of from greater than 50,000 to 2,000,000 Da.

The core of the benefit agent delivery capsules of the present disclosure may comprise a partitioning modifier, which may facilitate more robust shell formation. The partitioning modifier may be combined with the core's perfume oil material prior to incorporation of the wall-forming monomers. The partitioning modifier may be present in the core at a level of from about 5% to about 55%, preferably from about 10% to about 50%, more preferably from about 25% to about 50%, by weight of the core.

The partitioning modifier may comprise a material selected from the group consisting of vegetable oil, modified vegetable oil, mono-, di-, and tri-esters of C4-C24 fatty acids, isopropyl myristate, dodecanophenone, lauryl laurate, methyl behenate, methyl laurate, methyl palmitate, methyl stearate, and mixtures thereof. The partitioning modifier may preferably comprise or even consist of isopropyl myristate. The modified vegetable oil may be esterified and/or brominated. The modified vegetable oil may preferably comprise castor oil and/or soybean oil. US Patent Application Publication 20110268802, incorporated herein by reference, describes other partitioning modifiers that may be useful in the presently described benefit agent delivery capsules.

The perfume delivery capsule may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, and combinations thereof. The freshening composition may include one or more types of benefit agent delivery capsules, for examples two benefit agent delivery capsule types, wherein one of the first or second benefit agent delivery capsules (a) has a wall made of a different wall material than the other; (b) has a wall that includes a different amount of wall material or monomer than the other; or (c) contains a different amount perfume oil ingredient than the other; (d) contains a different perfume oil; (e) has a wall that is cured at a different temperature; (f) contains a perfume oil having a different c Log P value; (g) contains a perfume oil having a different volatility; (h) contains a perfume oil having a different boiling point; (i) has a wall made with a different weight ratio of wall materials; (j) has a wall that is cured for different cure time; and (k) has a wall that is heated at a different rate.

Preferably, the perfume delivery capsule has a wall material comprising a polymer of acrylic acid or derivatives thereof and a benefit agent comprising a perfume mixture.

More preferably, the perfume delivery capsule has a wall material comprising silica and a benefit agent comprising a perfume mixture such as the delivery capsules disclosed in US 2020/0330949 A1.

Neat Perfume Materials

The solid dissolvable composition may include unencapsulated perfume comprising one or more perfume raw materials that solely provide a hedonic benefit (i.e., that do not neutralize malodors yet provide a pleasant fragrance). Suitable perfumes are disclosed in U.S. Pat. No. 6,248,135. For example, the solid dissolvable composition may include a mixture of volatile aldehydes for neutralizing a malodor and hedonic perfume aldehydes.

Aqueous Phase

The aqueous phase present in the Solid Dissolvable Composition Mixtures and the Solid Dissolvable Compositions, is composed of an aqueous carrier of water and optionally other minors including sodium chloride.

The aqueous phase may be present in the Solid Dissolvable Composition Mixtures in an amount of from about 65 wt % to 95 wt %, about 65 wt % to about 90 wt %, about 65 wt % to about 85 wt %, by weight of a rheological solid that is formed as an intermediate composition after crystallization of the Solid Dissolvable Composition Mixture. The aqueous phase may be present in the Solid Dissolvable Composition in an amount of 0 wt % to about 10 wt %, 0 wt % to about 9 wt %, 0 wt % to about 8 wt %, or about 5 wt %, by weight of the intermediate rheological solid.

Sodium chloride in aqueous phase Solid Dissolvable Composition Mixtures may be present between 0 wt % to about 10 wt %, between 0 wt % to about 5 wt %, or between 0 wt % to about 1 wt %. Sodium chloride in Solid Dissolvable Compositions may be present between 0 wt % to about 50 wt %, between 0 wt % to about 25 wt %, or between 0 wt % to about 5 wt %. In embodiments the SDC may contain less than 2 wt % sodium chloride, to ensure humidity stability.

SDC Domains

Solid dissolvable composition domains are primarily composed of the solid dissolvable composition, describe here within.

In one embodiment, SDC domains contain less than about 13 wt %; in another embodiment, SDC domains contain between about 10 wt % and 1 wt % neat perfume; in another embodiment SDC domains contain between about 8 wt % and 2 wt % neat perfume, as exemplified as "% Freshness Agent (dry)" in the examples.

In one embodiment, SDC domains contain less than about 16 wt %; in another embodiment SDC domains contain between about 15 wt % and 1 wt % perfume capsules; in another embodiment SDC domains contain between about 15 wt % and 2 wt % perfume; in another embodiment SDC domains contain between about 15 wt % and 5 wt % perfume capsules, as exemplified as "% Freshness Agent (dry)" in the examples.

PEGC Domains

Polyethylene glycol (PEG) materials are preferred carrier materials of the non-porous dissolvable solid structure domains of the present invention. PEG materials generally have a relatively low cost, may be formed into many different shapes and sizes, dissolve well in water, and liquefy at elevated temperatures. PEG materials come in various molecular weights. In the consumer product compositions of the present invention, the PEG carrier materials have a molecular weight of from about 200 to about 50,000 Daltons, preferably from about 500 to about 20,000 Daltons, preferably from about 1,000 to about 15,000 Daltons, preferably from about 1,500 to about 12,000 Daltons, alternatively from about 6,000 to about 10,000 Daltons, and combinations thereof. Suitable PEG carrier materials include material having a molecular weight of about 8,000 Daltons, PEG material having a molecular weight of about 400 Daltons, PEG material having a molecular weight of about 20,000 Dalton, or mixtures thereof. Suitable PEG carrier materials are commercially available from BASF under the trade name PLURIOL, such as PLURIOL E 8000.

In one embodiment, PEGC domains contain less than about 30 wt %; in another embodiment, PEGC domains contain between 15 wt % and 1 wt % neat perfume; in another embodiment, PEGC domains contain between 12 wt % and 2 wt % neat perfume; in another embodiment, PEGC domains contain between 12 wt % and 5 wt % neat perfume; in another embodiment, PEGC domains contain between 10 wt % and 2 wt % neat perfume, as exemplified as "% Freshness Agent" in the examples.

In one embodiment, PEGC domains contain less than about 2 wt %; in another embodiment, PEGC domains contain between 1.5 wt % and 0.1 wt % perfume capsules; in another embodiment, PEGC domains contain between 1.25 wt % and 0.2 wt % perfume capsules; in another embodiment, PEGC domains contain between 1.25 wt % and 0.5 wt % perfume capsules, as exemplified as "% Freshness Agent" in the examples.

Particles

Particle compositions can vary depending on the need for the low-water composition.

As non-limiting examples, where particles are composed substantially of one domain. In one embodiment, the freshness benefit agent is perfume capsules dispersed primarily in a particle composed of SDC; in another embodiment, the freshness benefit agent is neat perfumes dispersed primarily in a particle composed of SDC; in one embodiment, the freshness benefit agent is perfume capsules dispersed primarily in a particle composed of PEGC; in another embodiment, the freshness benefit agent is neat perfumes dispersed primarily in a particle composed of PEGC; in one embodiment, the freshness benefit agent comprises perfume capsules and neat perfume dispersed primarily in a particle composed of SDC; in one embodiment, the freshness benefit agent is perfume capsules and neat perfume dispersed primarily in a particle composed of PEGC.

Figure 7:
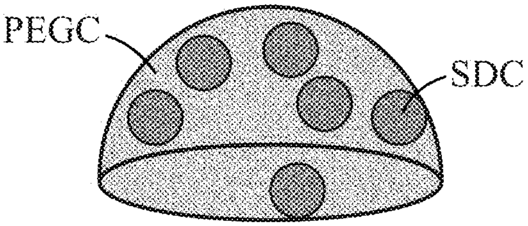
FIG. 7 Is an illustration of a particle in a Low-Water Composition, as described in Example 1.

As non-limiting examples, where particles are composed of two or more domains. In these cases, the SDC are small and completely enclosed in the PEGC domain. In one embodiment, the freshness benefit agent is perfume capsules dispersed primarily in a particle composed of SDC domain, which are dispersed in PEGC domain (FIG. 7, Example 1); In another embodiment, the freshness benefit agent is perfume capsules dispersed primarily in a particle composed of SDC domain, which are dispersed in PEGC domain containing neat perfume. In another embodiment, the freshness benefit agent is neat perfume dispersed primarily in a particle composed of SDC domain, which are dispersed in PEGC domain containing perfume capsules. Typical particles contain less than about 50 wt % SDC domains; in another embodiment between about 45 wt % and 10 wt % SDC domains; in another embodiment between about 40 wt % and 15 wt % SDC domains; in another embodiment between about 35 wt % and 20 wt % SDC domains.

Figure 8:
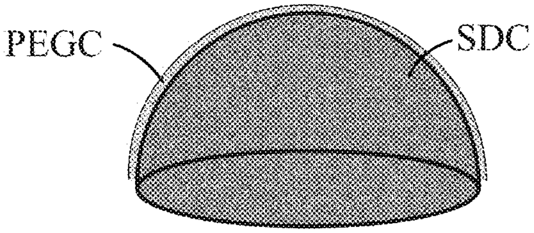
FIG. 8 Is an illustration of a particle in a Low-Water Composition, as described in Example 2.

As non-limiting examples, where particles are composed of two or more domains. In these cases, the particle has a core of a single SDC domain coated and completely enclosed in a coating of PEGC domain. In one embodiment, the freshness benefit agent is perfume capsules dispersed primarily in a particle composed of SDC domain, which are dispersed in PEGC domain (FIG. 8, Example 2); In another embodiment, the freshness benefit agent is perfume capsules dispersed primarily in a particle composed of SDC domain, which are dispersed in PEGC domain containing neat perfume. In another embodiment, the freshness benefit agent is net perfume dispersed primarily in a particle composed of SDC domain, which are dispersed in PEGC domain containing perfume capsules. Typical particles contain less than about 90 wt % SDC domains; in another embodiment, between about 80 wt % and 40 wt % SDC domains; in another embodiment, between about 80 wt % and 50 wt % SDC domains; in another embodiment, between about 50 wt % and 35 wt % SDC domains.

Figure 9:
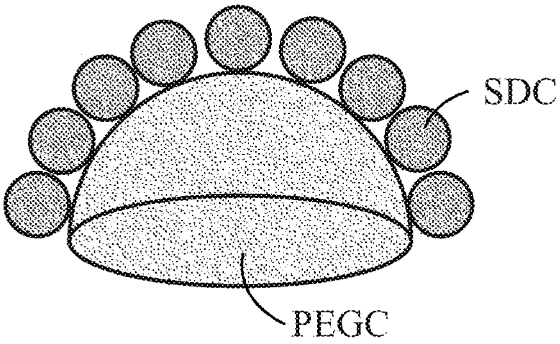
FIG. 9 Is an illustration of a particle in a Low-Water Composition, as described in Example 3.

As non-limiting examples, where particles are composed of two or more domains. In these cases, the particle has a core of a PEGC domain and sprinkled with SDC domains. In one embodiment, the freshness benefit agent is perfume capsules dispersed primarily in a particle composed of SDC domain, which are dispersed in PEGC domain (FIG. 9, Example 3); In another embodiment, the freshness benefit agent is perfume capsules dispersed primarily in a particle composed of SDC domain, which are dispersed in PEGC domain containing neat perfume. In another embodiment, the freshness benefit agent is neat perfume dispersed primarily in a particle composed of SDC domain, which are dispersed in PEGC domain containing perfume capsules. Typical particles contain less than 25 wt %; in another embodiment, between about 20 wt % and 2 wt % SDC domains; in another embodiment, between about 15 wt % and 5 wt % SDC domains.

Figure 10:
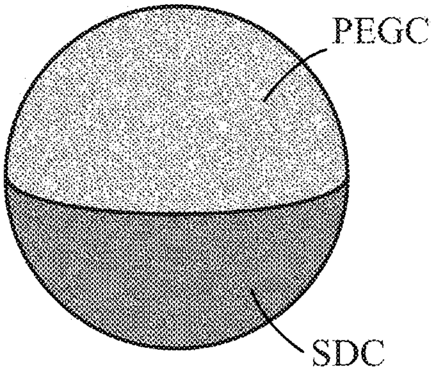
FIG. 10 Is an illustration of a particle in a Low-Water Composition, as described in Example 4.

As non-limiting examples, where particles are composed of two or more domains. In these cases, the particle has one side containing PEGC domain and one side containing SDC domain. In one embodiment, the freshness benefit agent is perfume capsules dispersed primarily in a particle composed of SDC domain, which are dispersed in PEGC domain (FIG. 10, Example 4); In another embodiment, the freshness benefit agent is perfume capsules dispersed primarily in a particle composed of SDC domain, which are dispersed in PEGC domain containing neat perfume. In another embodiment, the freshness benefit agent is neat perfume dispersed] primarily in a particle composed of SDC domain, which are dispersed in PEGC domain containing perfume capsules. Typical particles contain between about 75 wt % and 25 wt % SDC domains; in another embodiment, between 70 wt % and 30 wt % SDC domains; in another embodiment, between 60 wt % and 40 wt % SDC domains.

In embodiments, particles of the low-water composition have a shape, which may include hemi-spheres, plates, cubes, cashew, gummi bears, tubes, and spheres. In another embodiment, the particles have the longest dimension of 3 cm. In another embodiment, the particles have a mean weight less than about 1,000 mg, between about 750 mg and 1 mg, and between about 500 mg and 5 mg.

Low-Water Compositions

Low-water compositions are composed of one or more particle(s) and contain at least one SDC domain and at least on PEGC (Example 5).

SDC domains may represent between about 10 wt % to about 90 wt %, or between about 10 wt % to about 70 wt %, or between about 30 wt % to about 90 wt %, or between about 40 wt % to about 60 wt %, of the low-water compositions, when summed over all particles.

PEGC domains may represent between about 10 wt % to about 90 wt %, or between about 10 wt % to about 70 wt %, or between about 30 wt % to about 90 wt %, or between about 40 wt % to about 60 wt %, of the low-water compositions, when summed over all particles Consumer Product Compositions In one embodiment, the consumer product is added directly into the wash drum, at the start of the wash; in another embodiment, the consumer product is added to the fabric enhancer cup in the washer; in another embodiment, the consumer product is added at the start of the wash; in another embodiment, the consumer product is added during the wash.

In one embodiment, the consumer product is sold in paper packaging, due to the Hydration and Temperature Stability of the composition; in one embodiment, the consumer product is sold in unit dose packaging; in one embodiment, the consumer product is sold with different colored particles; in one embodiment, the consumer product is sold in a sachet; in one embodiment, the consumer product is sold with different colored particles; in one embodiment, the consumer product is sold in a recyclable container.

Dissolution Test Method

All samples and procedures are maintained at room temperature (25±3° C.) prior to testing, and are placed in a desiccant chamber (0% RH) for 24 hours, or until they come to a constant weight.

All dissolution measurements are done at a controlled temperature and a constant stir rate. A 600-mL jacketed beaker (Cole-Palmer, item #UX-03773-30, or equivalent) is attached and cooled to temperature by circulation of water through the jacketed beaker using a water circulator set to a desired temperature (Fisherbrand Isotemp 4100, or equivalent). The jacketed beaker is centered on the stirring element of a VWR Multi-Position Stirrer (VWR North American, West Chester, Pa., U.S.A. Cat. No. 12621-046). 100 mL of deionized water (MODEL 18 MΩ, or equivalent) and stirring bar (VWR, Spinbar, Cat. No. 58947-106, or equivalent) is added to a second 150-mL beaker (VWR North American, West Chester, Pa., U.S.A. Cat. No. 58948-138, or equivalent). The second beaker is placed into the jacketed beaker. Enough Millipore water is added to the jacketed beaker to be above the level of the water in the second beaker, with great care so that the water in the jacket beaker does not mix with the water in the second beaker. The speed of the stir bar is set to 200 RPM, enough to create a gentle vortex. The temperature is set in the second beaker using the flow from the water circulator to reach 25° C. or 37° C., with relevant temperature reported in the examples. The temperature in the second beaker is measured with a thermometer before doing a dissolution experiment.

All samples were sealed in a desiccator prepared with fresh desiccant (VWR, Desiccant-Anhydrous Indicating Drierite, stock no. 23001, or equivalent) until reaching a constant weight. All tested samples have a mass less than 15 mg.

A single dissolution experiment is done by removing a single sample from the desiccator. The sample is weighed within one minute after removing it from the desiccator to measure an initial mass ($M_I$). The sample is dropped into the second beaker with stirring. The sample is allowed to dissolve for 1 minute. At the end of the minute, the sample is carefully removed from the deionized water. The sample is placed again in the desiccator until reaching a constant final mass. The percentage of mass loss for the sample in the single experiment is calculated as $M_L=100*(M_I-M_F)/M_I$.

Nine additional dissolution experiments are done, by first replacing the 100 ml of water with a new charge of deionized water, adding a new sample from the desiccator for each experiment and repeating the dissolution experiment described in the previous paragraph.

The average percent of mass loss ($M_A$) for the Test is calculated as the average percent of mass loss for the ten experiments and the average standard deviation of mass loss ($SD_A$) is the standard deviation of the mean percent of mass loss for the ten experiments.

The method returns three values: 1) the average mass of the sample ($M_S$), 2) the temperature at which the samples are dissolved (T), and 3) the average percent of mass loss ($M_A$). The method returns 'NM' for all values if the method was not performed on the sample. The average percent of mass loss ($M_A$) and the average standard deviation of the mean percent of mass loss ($SD_A$) are used to draw the dissolutions curves shared in FIG. 4A, FIG. 4B and FIG. 4C.

Humidity Test Method

The Humidity Test Method is used to determine the amount of water vapor sorption that occurs in a composition between being dried down at 0% RH and various RH at 25° C. In this method, 10 to 60 mg of sample are weighed, and the mass change associated with being conditioned with differing environmental states is captured in a dynamic vapor sorption instrument. The resulting mass gain is expressed as % change in mass per dried sample mass recorded at 0% RH.

This method makes use of a SPSx Vapor Sorption Analyzer with 1 μg resolution (ProUmid GmbH & Co. KG, Ulm, Germany), or equivalent dynamic vapor sorption (DVS) instrument capable of controlling percent relative humidity (% RH) to within ±3%, temperature to within ±2° C., and measuring mass to a precision of ±0.001 mg.

A 10-60 mg specimen of raw material or composition is dispersed evenly into a tared 1" diameter Al pan. The Al pan on which raw material or composition specimen has been dispersed is placed in the DVS instrument with the DVS instrument set to 25° C. and 0% RH at which point masses are recorded ~every 15 minutes to a precision of 0.001 mg or better. After the specimen is in the DVS for a minimum of 12 hours at this environmental setting and constant weight has been achieved, the mass $m_d$ of the specimen is recorded to a precision of 0.01 mg or better. Upon completion of this step, the instrument is advanced in 10% RH increments up to 90% RH. The specimen is held in the DVS at each step for a minimum of 12 hours and until constant weight has been achieved, the mass $m_n$ of the specimen is recorded to a precision of 0.001 mg or better at each step.

For a particular specimen, constant weight can be defined as change in mass consecutive weighing that does not differ by more than 0.004%. For a particular specimen, % Change in mass per dried sample mass (% dm) is defined as $$\%\text{ Change in mass per dried sample mass} = \frac{m_n - m_d}{m_d} \times 100\%$$

The % Change in mass per dried sample mass is reported in units of % to the nearest 0.01%.

The humidity stability at 80% RH, means that there is less than or equal to a 5% change at 80% RH; no humidity stability at 80% RH, means that there is greater than 5% change at 80%.

Thermal Stability Test Method

All samples and procedures are maintained at room temperature (25±3° C.) prior to testing, and at a relative humidity of 40±10% for 24 hours prior to testing.

In the Thermal Stability Test Method, differential scanning calorimetry (DSC) is performed on a 20 mg±10 mg specimen of sample composition. A simple scan is performed between 25° C. and 90° C., and the temperature at which the largest peak is observed to occur is reported as the Stability Temperature to the nearest ° C.

The sample is loaded into a DSC pan. All measurements are done in a high-volume-stainless-steel pan set (TA part

#900825.902). The pan, lid and gasket are weighed and tared on a Mettler Toledo MT5 analytical microbalance (or equivalent; Mettler Toledo, LLC., Columbus, OH). The sample is loaded into the pan with a target weight of 20 mg (+/−10 mg) in accordance with manufacturer's specifications, taking care to ensure that the sample is in contact with the bottom of the pan. The pan is then sealed with a TA High Volume Die Set (TA part #901608.905). The final assembly is measured to obtain the sample weight. The sample is loaded into TA Q Series DSC (TA Instruments, New Castle, DE) in accordance with the manufacture instructions. The DSC procedure uses the following settings: 1) equilibrate at 25° C.; 2) mark end of cycle 1; 3) ramp 1.00° C./min to 90.00° C.; 4) mark end of cycle 3; then 5) end of method; Hit run.

Moisture Test Method

All samples and procedures are maintained at room temperature (25±3° C.) prior to testing, and at a relative humidity of 40±10% for 24 hours prior to testing.

The Moisture Test Method is used to quantify the weight percent of water in a composition. In this method, a Karl Fischer (KF) titration is performed on each of three like specimens of a sample composition. Titration is done using a volumetric KF titration apparatus and using a one-component solvent system. Specimens are 0.3±0.05 g in mass and are allowed to dissolve in the titration vessel for 2.5 minutes prior to titration. The average (arithmetic mean) moisture content of the three specimen replicates is reported to the nearest 0.1 wt. % of the sample composition.

To measure the moisture content of the sample, measurements are made using a Mettler Toledo V30S Volumetric KF Titrator. The instrument uses Honeywell Fluka Hydranal Solvent (cat. #34800-1L-US) to dissolve the sample, Honeywell Fluka Hydranal Titrant-5 (cat. #34801-1L-US) to titrate the sample and is equipped with three drying tubes (Titrant Bottle, Solvent Bottle, and Waste Bottle) packed with Honeywell Fluka Hydranal Molecular sieve 3 nm (cat. #34241-250 g) to preserve the efficacy of the anhydrous materials.

The method used to measure the sample is Type "KF vol", ID "U8000", and Title "KFVol 2-comp 5", and has eight lines which are each method functions.

The Line 1, Title has the following things selected: the Type is set to Karl Fischer titration Vol.; Compatible with is set to be V10S/V20S/V30S/T5/T7/T9; ID is set as U8000; Title is set as KFVol 2-comp 5; Author is set as Administrator; the Date/Time along with the Modified on and Modified by were defined by when the method was created; Protect is set to no; and SOP is set to None.

The Line 2, Sample has two options, Sample and Concentration. When the Sample option is chosen, the following fields are defined as: Number of IDs is set as 1; ID 1 is set as—; Entry type is selected to be Weight; Lower limit is set as 0.0 g; the Upper limit is set as 5.0 g; Density is set as 1.0 g/mL; Correction factor is set as 1.0; Temperature is set to 25.0° C.; Autostart is selected; and Entry is set to After addition. When the Concentration option is chosen, the following fields are defined as: Titrant is selected as KF 2-comp 5; Nominal conc. is set as 5 mg/mL; Standard is selected to be Water-Standard 10.0; Entry type is selected to be Weight; Lower limit is set as 0.0 g; Upper limit is set as 2.0 g; Temperature is set as 25.0° C.; Mix time is set as 10 s; Autostart is selected; Entry is selected to be After addition; Conc. lower limit is set to be 4.5 mg/mL; and Conc. upper limit is set to be 5.6 mg/mL.

The Line 3, Titration stand (KF stand) has the following fields defined as: Type is set to KF stand; Titration stand is selected to be KF stand; Source for drift is selected to be Online; Max. start drift is set to be 25.0 µg/min.

The Line 4, Mix time has the following fields defined as: Duration is set to be 150 s.

The Line 5, Titration (KF Vol) [1] has six options, Titrant, Sensor, Stir, Predispense, Control, and Termination. When the Titrant option is chosen, the following fields are defined as: Titrant is selected to be KF 2-comp 5; Nominal conc. is set to be 5 mg/mL; and Reagent type is set as 2-comp. When the Sensor option is chosen, the following fields are defined as: Type is set to Polarized; Sensor is selected as DM143-SC; Unit is set as mV; Indication is set as Voltametric; and Ipol is set as 24.0 µA. When the Stir option is chosen, the following fields are defined as: Speed is set as 50%. When the Predispense option is chosen, the following fields are defined as: Mode is selected to be None; Wait time is set to be 0 s. When the Control option is chosen, the following fields are defined as: End Point is set to 100.00 mV; Control band is set to be 400.00 mV; Dosing rate (max) is set to be 3 mL/min; Dosing rate (min) is set to be 100 µL/min; and Start is selected to be Normal. When the Termination option is chosen, the following fields are defined as: Type is selected as Drift stop relative; Drift is set to 15.0 µg/min; At V max 15 mL; Min. time is set as 0 s; and Max. time is set as ∞ s.

The Line 6, Calculation has the following fields defined as: Result type is selected to be Predefined; Result is set as Content; Result unit is set as %; Formula is set as R1=(VEQ*CONC−TIME*D . . . ); Constant C=is set as 0.1; Decimal places is set as 2; Result limits is not selected; Record statistics is selected; Extra statistical functions is not selected.

The Line 7, Record has the following fields defined as: Summary is selected to be Per sample; Results is selected to be No; Raw results is selected to be No; Table of meas. values is selected to be No; Sample data is selected to be No; Resource data is selected to be No; E-V is selected to be No; E-t is selected to be No; V-t is selected to be No; H2O-t is selected to be No; Drift-t is selected to be No; H2O-t & Drift-t is selected to be no; V-t & Drift-t is selected to be No; Method is selected to be No; and Series data is selected to be No.

The Line 8, End of Sample has the following fields defined as: Open series is selected.

Once the method is selected, press Start, the following fields are defined as: Type is set as Method; Method ID is set as U8000; Number of samples is set as 1; ID 1 is set as—; and Sample size is set as 0 g. The Start option is the pressed again. The instrument will measure the Max Drift, and once it reaches a steady state will allow the user to select Add sample, at which point the user will add the Three-hole adapter and stoppers are removed, the sample is loaded into the Titration beaker, the Three-hole adapter and stoppers are replaced, and the mass, g, of the sample is entered into the Touchscreen. The reported value will be the weight percent of water in the sample. This measure is repeated in triplicate for each sample, and the average of the three measures is reported.

Fibers Test Method

Figure 11A:
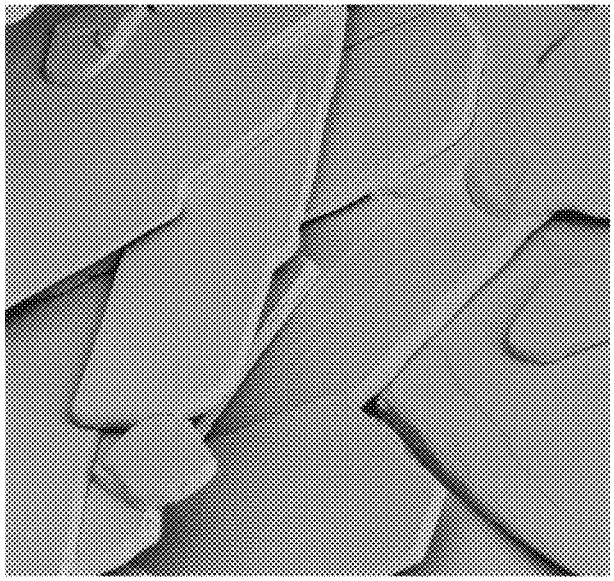
FIG. 11A shows a representative Scanning Electron Micrograph (SEM) of a comparative composition prepared from potassium palmitate (KC16), showing platelet crystals.
Figure 11B:
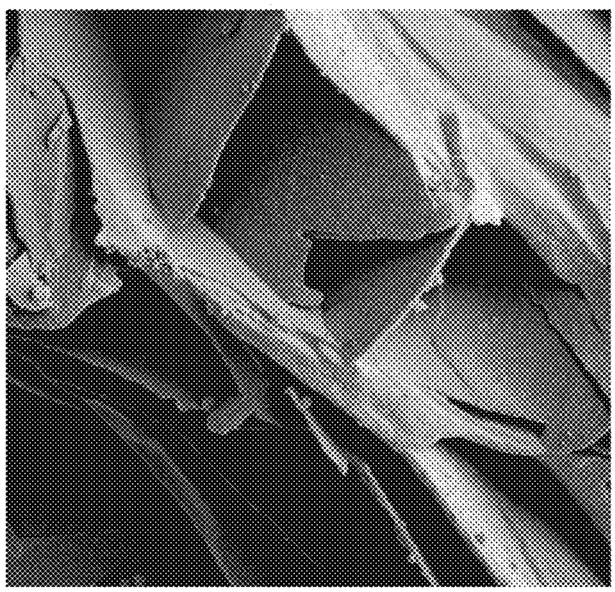
FIG. 11B shows a representative Scanning Electron Micrograph (SEM) of a comparative composition prepared from triethanolamine palmitate (TEA C16), showing platelet crystals.

The Fiber Test Method is used to determine whether a solid dissolved composition crystallizes under process conditions and contains fiber crystals. A simple definition of a fiber is "a thread or a structure or an object resembling a thread". Fibers have a long length in just one direction (FIG. 1A and FIG. 1B). This differs from other crystal morphologies such as plates or platelets—with a long length in two or more directions (FIG. 11A and FIG. 11B). Only solid dissolvable compositions in which the DCS as fibers are in scope of this invention. One skilled in the art recognizes the SDC domains from the PEGC domains in the solid dissolvable compositions, when present in the same particle.

A sample measuring about 4 mm in diameter is mounted on an SEM specimen shuttle and stub (Quorum Technologies, AL200077B and E7406) with a slit precoated comprising a 1:1 mixture of Scigen Tissue Plus optimal cutting temperature (OCT) compound (Scigen 4586) compound and colloidal graphite (agar scientific G303E). The mounted sample is plunge-frozen in a liquid nitrogen-slush bath. Next, the frozen sample is inserted to a Quorum PP3010T cryo-prep chamber (Quorum Technologies PP3010T), or equivalent and allowed to equilibrate to −120° C. prior to freeze-fracturing. Freeze fracturing is performed by using a cold built-in knife in the cryo-prep chamber to break off the top of the vitreous sample. Additional sublimation is performed at −90° C. for 5 mins to eliminate residual ice on the surface of the sample. The sample is cooled further to −150° C. and sputter-coated with a layer of Pt residing in the cryo-prep chamber for 60 s to mitigate charging.

High resolution imaging is performed in a Hitachi Ethos NX5000 FIB-SEM (Hitachi NX5000), or equivalent.

To determine the fiber morphology of a sample, imaging is done at 20,000× magnification. At this magnification, individual crystals of the crystallizing agent may be observed. The magnification may be slightly adjusted to lower or higher values until individual crystals are observed. One skilled in the art can assess the longest dimension of the representative crystals in the image. If this longest dimension is about 10× or greater than the other orthogonal dimensions of the crystals, these crystals are considered fibers and in scope for the invention.

EXAMPLES

These examples provide non-limiting examples of low-water compositions comprising solid dissolvable composition (SDC) domains having a mesh microstructure formed from dry sodium fatty acid carboxylate formulations, polyethylene glycol (PEGC) domains, and active agents, such as freshness benefit agent(s) that deliver extraordinary freshness to fabrics dispersed into these domains.

The inventive compositions show particle comprising SDC domains comprising crystallizing agent that—when processed correctly, form fibrous mesh that completely dissolve within a wash cycle. The inventive compositions also show PEGC domains that—when used in combination with the SDC domains, create unique low-water composition that are easy to process, provide unique aesthetic properties and enhanced freshness performance.

The freshness benefit agent(s) takes the form of perfume capsules and/or neat perfumes being distributed into the different domains. Example 1 demonstrates particles composed of two or more domains in which the SDC domains are small and completely enclosed in a single PEGC domain (FIG. 7). EXAMPLE 2 demonstrates particles composed of two or more domains in which a single SDC domain is coated and completely enclosed in a coating of PEGC domain (FIG. 8). EXAMPLE 3 demonstrates particles composed of two or more domains in which the particles have a core of a PEGC domain and sprinkled with SDC domains (FIG. 9). EXAMPLE 4 demonstrates particles composed of two or more domains in which the particle has one side containing PEGC domain and one side containing SDC domain (FIG. 10). EXAMPLE 5 suggests low-moisture compositions composed of a physical mixture of two or more different types of particles and freshness benefit agents, where some of the particles are structured as described in Examples 1-4. Example 6 suggests compositions prepared from particular blends of fatty acid materials which are neutralized and blended with PEGC to create solid dissolvable compositions, and with perfume capsules with different wall architectures.

The data in TABLE 1-TABLE 8 provide the parameters about the particles in the following way:

Preparation SDC domains—all the weights listed in this part of table, correspond to the amounts added to create the Solid Dissolvable Composition Mixture (SDCM). The "% Freshness Agent (dry)" is the weight percent of the freshness agent remaining in the SDC after drying assuming there is no remaining water, as determined by the MOISTURE TEST METHOD. The "% Slow CA" is the weight percent of the NaC12 (slow dissolving) in mixtures of NaC12 with NaC10 and NaC8 (fast dissolving).

All SDC domains are prepared in three making steps, to ensure the formation of fiber mesh in the domain:

1. Mixing—in which crystallizing agents are completely solubilized in water to form SDCM, and optional addition of active agents;
2. Forming—in which the composition from the mixing step is shaped by size and dimensions of the desired SDC through techniques including crystallization;
3. Drying—in which amount of water is reduced to ensure the desired performance including dissolution, hydration, and thermal stability, and optional addition of active agents.

Preparation PEGC domains, all the weights listed in this part of table, correspond to the amounts of PEG and freshness agents added to create the PEGC. Any water added to the domain by the inclusion of perfume capsule slurry, is not removed and remains part of the domain when combined to form the low-water composition.

Low-water composition, all the weights listed in this part of table, correspond to the amounts of SDC and PEGC, combined to create the low-water composition particle. For clarity, the percentages of the components of the low-water composition are provided as "% CA"=crystallizing agents from the SDC in the final low-water composition, "% Perfume Capsules"=perfume capsules in the final low-water composition, "% Perfume"=neat perfume in the low-water composition, "% PEG"=PEG in the low-water composition, "% Water"=water in the low-water composition, including water not removed from the PEGC. Finally, "Ave. Mass"=the average mass of the particles created as described in each of the examples, of the low-water composition.

The data in TABLE 9-TABLE 10 provide prophetic particles composed SDC and PEGC domains only, the former with different blends of crystallizing agents and freshness benefit agents, and the latter with different molecular weight PEG and freshness benefit agents.

The data in TABLE 11-TABLE 12 provide prophetic low-water compositions, comprising of physical mixtures of particles with SDC domains, PEGC domains, and freshness benefit agents. The amount of 'Perfume capsules in wash' is a dose of perfume capsules in a wash to deliver a desired dry fabric feel benefit to a consumer. The amount of 'Neat capsules in wash' is a dose of neat perfume in a wash to deliver a desired wet fabric feel benefit to a consumer. The @ symbol displayed with the particles identifies the mass of the particles in the low-water composition. The 'Dosage of the composition' is the sum of all the particles in the low-water composition, and the amount the consumer adds to the wash.

The data in TABLE 13 provide prophetic low-water compositions, comprising SDC domains prepared from mixtures of C8, C10 and C12 chain length fatty acids that are neutralized to create SDC domains, which are then combined with PEGC domains, and with perfume capsules with different wall architectures.

Materials (1) Water: Millipore, Burlington, MA (18 m-ohm resistance)

(2) Sodium caprylic (sodium octanoate, NaC8): TCI Chemicals, Cat #00034

(3) Sodium caprate (sodium decanoate, NaC10): TCI Chemicals, Cat #D0024

(4) Sodium laurate (sodium dodecanoate, NaC12): TCI Chemicals, Cat #L0016

(5) Perfume capsule slurry: Encapsys, Encapsulated Perfume #1, melamine formealdehydepol wall chemistry, (31% activity)

(6) Perfume capsule slurry: Encapsys, Encapsulated Perfume #2, urea wall chemistry, (21% activity)

(7) PEG-6,000 g $mol^{-1}$, Alfa Aesar, Product Code A17541.30.

(8) PEG-8,000 g $mol^{-1}$, Alpha Aesar, Product Code 43443.

(9) PEG-9,000 g $mol^{-1}$, Dow Chemical, Product Code C4633240.

(10) PEG-10,000 g $mol^{-1}$, Alfa Aesar, Product Code B21955.30.

(11) Neat perfume: International Flavors and Fragrances, Neat Perfume Oil #1

(12) Fatty Acid Blend: C810L, Procter & Gamble Chemicals, Sample Code: SR26399

(13) Lauric Acid: Peter Cremer, Cat. #FA-1299 Lauric Acid

(14) Sodium Hydroxide (50 wt. % solution): Fisher Scientific, Cat. #SS254-4

(15) Perfume Capsule Slurry: Encapsys, Encapsulated Perfume #3 Polyacrylate wall chemistry, 21 wt. % active

(16) Perfume Capsule Slurry: Encapsys, Encapsulated Perfume #4, High Core to Wall ratio, Polyacrylate wall chemistry

(17) Encapsulated Perfume #5, Polyurea wall chemistry y, 32 wt. % active

(18) Perfume Capsule Slurry: Encapsulated Perfume #6, silica based wall chemistry, 6.2 wt. % active

EXAMPLE 1

EXAMPLE 1 demonstrates particles composed of two or more domains in which the SDC domains are completely enclosed in a single PEGC domain (FIG. 7).

This example demonstrates compositions that make it possible to adjust the amount and distribution of different freshness benefit agents using different domains in a single particle. In this non-limiting example, SDC domains are dispersed in a continuous domain of PEGC. This offers several advantages. First, SDC domains offer the opportunity to enhance the amount of perfume capsules (e.g., about 18 wt. %) in a particle relative to a single PEGC domain (e.g., about 1.2 wt. %). Second, these particles maintain a 'smooth' exterior appearance from the PEGC, to enhance the aesthetics of the particle. Third, such compositions offer advantages to manufacturing, where the flow properties of the 'melted' compositions are similar to the flow properties of an all-PEG compositions, providing the potential for these composite compositions to be prepared on existing, commercial equipment. Sample AA-Sample AI are non-limiting examples of compositions and weight ratio of the different domains possible in resulting particles, which can be used as low-water composition.

Preparation of SDC Domains

Mixing—a 250-ml stainless steel beaker (Thermo Fischer Scientific, Waltham, MA.) was placed on a hot plate (VWR, Radnor, PA, 7×7 CER Hotplate, cat. No. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the preparation. The heater was set at 80° C., the impeller was set to rotate at 250 rpm and the composition was heated to 80° C. or until all the crystallizing agent was solubilized and the composition was clear. The preparation was then poured into a Max 100 Mid Cup (Speed Mixer), capped, and allowed to cool to 25° C. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes.

Forming—the preparation was poured onto an aluminum foil to an even thickness of about 1 mm. The preparation was then placed in a refrigerator (VWR Door Solid Lock F Refrigerator 115V, 76300-508, or equivalent) equilibrated to 4° C. for 8 hours to crystallize the crystallizing agent.

Drying—they were placed in a convection oven (Yamato, DKN400, or equivalent) set at 25° C. for another 8 hours to pass a steady stream of air to dry the composition. The final SDC was confirmed to be less than 10% moisture by the MOISTURE TEST METHOD. The domains were in shape of the mold, or the flat sheet was broken into coarsely pieces on the order of 1-mm×1-mm in size.

Preparation of PEGC Domains

Separately, a 250-ml stainless steel beaker (Thermo Fischer Scientific, Waltham, MA.) was placed on a hot plate (VWR, Radnor, PA, 7×7 CER Hotplate, cat. no. NO97042-690). PEG (Material 8-11) was added to the beaker. A mixing device comprising an overhead mixer (IKA Works Inc, Wilmington, NC, model RW20 DMZ) and a three-blade impeller design was assembled, with the impeller placed in the preparation. A temperature probe was also placed into preparation. The impeller was set to rotate at 250 rpm. The preparation was heated to 100° C. until the PEG melted completely. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes. The preparation was used to make the low-water composition within 5 minutes of reaching the final temperature.

Preparation of Low-Water Compositions

A 60-ml speed mixer cup and cap (Speed Mixer) were weighed. The cap was removed, SDC domains were added to the cup. The cup was resealed with the cap and re-weighed, and the mass of SDC domains in the preparation is the difference in the weight.

A second 60-ml speed mixer cup and cap (Speed Mixer) were weighed. The cap was removed, freshness benefit agent was added to the cup. The cup was resealed with the cap and re-weighed, where the mass of the freshness benefit agent in the preparation is the difference in the weight. The cap was again removed from the cup.

In under 30 seconds, the PEGC was added to the cup, the cap was replaced, and the entire preparation was re-weighed where the mass of PEGC in the preparation is the difference in the weight. The cup was placed in the Speedmixer, it was started, and preparation was mixed at 3,000 RPM for 1 minute. After the mixing, in under 30 seconds (and before crystallization), the preparation was transferred to polymer mold patterned with 5-mm diameter hemispheres. The preparation was allowed to cool at 25° C. for at least 30 minutes. A drawing of the structure of a particle in this low-water composition, is shown in FIG. 7.

TABLE 1

| | Sample AA (inventive) | Sample AB (inventive) |
|---|---|---|
| Preparation SDC | | |
| 1) Water | 30.372 g | 60.92 g |
| 2) NaC8 | — | — |
| 3) NaC10 | 3.750 g | 10.010 g |
| 4) NaC12 | 8.752 g | 15.007 g |
| 5) Perfume capsules (Melamine Formaldehyde) | 7.139 g | 15.30 g |
| 6) Perfume capsules (polyacrylate) | — | — |
| 11) Perfume | — | — |
| % Freshness Agent (dry) | 15.0% | 15.9% |
| % Slow CA | 70.0% | 60.0% |
| Preparation PEGC | | |
| 7) PEG 6,000 | — | — |
| 8) PEG 8,000 | 20.791 g | — |
| 9) PEG 9,000 | — | 19.497 g |
| 10) PEG 10,000 | — | — |
| 5) Perfume capsules (Melamine Formaldehyde) | — | — |
| 6) Perfume capsules (polyacrylate) | — | — |
| 11) Perfume | — | 4.232 g |
| % Freshness Agent | — | 17.8% |
| Low-water composition | | |
| SDC domain | 4.902 g | 2.848 g |
| PEGC domain | 20.791 g | 18.547 g |
| % CA | 16.2% | 11.2% |
| % Perfume Capsules | 2.8% | 2.1% |
| % Perfume | — | 15.5% |
| % PEG | 81.0% | 71.2% |
| % Water | — | — |
| Ave. Mass | 43.3 mg | 50.5 mg |

TABLE 2

| | Sample AC (inventive) | Sample AD (inventive) | Sample AE (inventive) | Sample AF (inventive) |
|---|---|---|---|---|
| Preparation SDC | | | | |
| 1) Water | 60.92 g | 60.92 g | 27.011 g | 34.726 g |
| 2) NaC8 | — | — | — | — |
| 3) NaC10 | 10.01 g | 10.01 g | 3.757 g | 10.000 g |
| 4) NaC12 | 15.007 g | 15.007 g | 8.750 g | — |
| 5) Perfume capsules (melamine formaldehyde) | 15.30 g | 15.30 g | — | 5.296 g |

TABLE 2-continued

| | Sample AC (inventive) | Sample AD (inventive) | Sample AE (inventive) | Sample AF (inventive) |
|---|---|---|---|---|
| 6) Perfume capsules (polyacrylate) | — | — | 10.497 g | — |
| 11) Perfume | — | — | — | — |
| % Freshness Agent (dry) | 16.0% | 16.0% | 15.0% | 14.1% |
| % Slow CA | 60.0% | 60.0% | 70.0% | — |
| Preparation PEGC | | | | |
| 7) PEG 6,000 | — | — | — | — |
| 8) PEG 8,000 | 16.483 g | 35.842 g | 27.252 g | — |
| 9) PEG 9,000 | — | — | — | 13.568 g |
| 10) PEG 10,000 | — | — | — | — |
| 5) Perfume capsules (melamine formaldehyde ) | — | — | — | — |
| 6) Perfume capsules (polyacrylate) | — | — | — | — |
| 11) Perfume | 1.889 g | 5.737 g | 1.089 g | 4.675 g |
| % Freshness Agent | 10.3% | 13.8% | 3.8% | 25.6% |
| Low-water composition | | | | |
| SDC domain | 5.781 g | 17.091 g | 11.303 g | 15.414 g |
| PEGC domain | 12.794 g | 41.579 g | 28.341 g | 18.243 g |
| % CA | 26.2% | 24.5% | 24.2% | 39.3% |
| % Perfume Capsules | 5.0% | 4.6% | 4.3% | 6.5% |
| % Perfume | 7.1% | 9.8% | 2.8% | 13.9% |
| % PEG | 61.8% | 61.1% | 68.7% | 40.3% |
| % Water | — | — | — | — |
| Ave. Mass | 43.8 mg | 60.8 mg | 56.7 mg | 39.4 mg |

TABLE 3

| | Sample AG (inventive) | Sample AH (inventive) | Sample AI (inventive) |
|---|---|---|---|
| Preparation SDC | | | |
| 1) Water | 35.721 g | 36.116 g | 37.380 g |
| 2) NaC8 | — | — | — |
| 3) NaC10 | 5.006 g | 5.009 g | 5.006 g |
| 4) NaC12 | 7.513 g | 7.500 g | 7.501 g |
| 5) Perfume capsules (melamine formaldehyde) | — | — | — |
| 6) Perfume capsules (POLYACRYLATE) | — | — | — |
| 11) Perfume | 1.809 g | 1.399 g | 0.130 g |
| % Freshness Agent (dry) | 12.6% | 10.1% | 1.0% |
| % Slow CA | 60.0% | 60.0% | 60.0% |
| Preparation PEGC | | | |
| 7) PEG 6,000 | — | 25.382 g | — |
| 8) PEG 8,000 | — | — | — |
| 9) PEG 9,000 | — | — | — |
| 10) PEG 10,000 | 25.017 g | — | 24.853 g |
| 5) Perfume capsules (melamine formaldehyde) | 1.161 g | 1.073 g | |
| 6) Perfume capsules (POLYACRYLATE) | — | — | 2.072 g |
| 11) Perfume | — | — | — |
| % Freshness Agent | 1.4% | 1.3% | 1.6% |
| Low-water composition | | | |
| SDC domain | 5.246 g | 6.661 g | 1.598 g |

TABLE 3-continued

| | Sample AG (inventive) | Sample AH (inventive) | Sample AI (inventive) |
|---|---|---|---|
| PEGC domain | 26.178 g | 26.455 g | 26.925 g |
| % CA | 14.6% | 18.1% | 5.54% |
| % Perfume Capsules | 1.2% | 1.0% | 1.5% |
| % Perfume | 2.1% | 2.0% | 0.1% |
| % PEG | 70.6% | 76.7% | 87.1% |
| % Water | 2.6% | 2.2% | 5.7% |
| Ave. Mass | 50.5 mg | 52.5 mg | 58.0 mg |

EXAMPLE 2

EXAMPLE 2 demonstrates particles composed of two or more domains in which a single SDC domain is coated and completely enclosed in a coating of PEGC domain (FIG. 8).

This example demonstrates compositions have particles with SDC domain core and a PEGC coating. In this non-limiting example, SDC a single domain is enclosed in a continuous domain of PEGC. This has several advantages. These particles offer the opportunity to enhance the amount of perfume capsules in SDC domain (e.g., high as about 18 wt. %) relative to the amount perfume capsules in SDC domain (e.g., only as high as about 1.3 wt. %). The particles have about a ten-fold increase in freshness benefit agent capacity. The SDC domains are also about 50-70% less dense, making the particles (and the resulting low-water composition) more agreeable to different commercial approach such as e-commercial, more sustainable with less carrier required for unit freshness, and more sustainable replacing petroleum-based PEG with natural crystallizing agents. Further, the use of the PEGC coating allows the particle to maintain a 'smooth' or sheen outer appearance of the PEGC domain, valued by many consumers. Sample BA-Sample BI are non-limiting examples of compositions and weight ratio of the different domains possible in resulting particles.

Preparation of SDC Domains

Mixing—a 250-ml stainless steel beaker (Thermo Fischer Scientific, Waltham, MA.) was placed on a hot plate (VWR, Radnor, PA, 7×7 CER Hotplate, cat. no. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the preparation. The heater was set at 80° C., the impeller was set to rotate at 250 rpm and the composition was heated to 80° C. or until all the crystallizing agent was solubilized and the composition was clear. The preparation was then poured into a Max 100 Mid Cup (Speed Mixer), capped, and allowed to cool to 25° C. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes.

Forming—the preparation was transferred to polymer mold patterned with 5-mm diameter hemispheres. The preparation was then placed in a refrigerator (VWR Door Solid Lock F Refrigerator 115V, 76300-508, or equivalent) equilibrated to 4° C. for 8 hours to crystallize the crystallizing agent.

Drying—they were placed in a convection oven (Yamato, DKN400, or equivalent) set at 25° C. for another 8 hours to pass a steady stream of air to dry the composition. The final SDC was confirmed to be less than 10% moisture by the MOISTURE TEST METHOD.

Preparation of PEGC Domains

Separately, a 250-ml stainless steel beaker (Thermo Fischer Scientific, Waltham, MA.) was placed on a hot plate (VWR, Radnor, PA, 7×7 CER Hotplate, cat. no. NO97042-690). PEG (Material 8-11) was added to the beaker. A mixing device comprising an overhead mixer (IKA Works Inc, Wilmington, NC, model RW20 DMZ) and a three-blade impeller design was assembled, with the impeller placed in the preparation. A temperature probe was also placed into preparation. The impeller was set to rotate at 250 rpm. The preparation was heated to 100° C. until the PEG melted completely. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes. The preparation was used to make the low-water composition within 5 minutes of reaching the final temperature.

Preparation of Low-Water Compositions

Measured the weight of weigh boat. The SDC in was placed in the weigh boat, where the weight of the SDC is determined by the difference in the mass. The SDC is dipped into the PEGC melt. The excess PEGC was wiped from the surface of the SDC. The preparation was placed in the weigh boat. The preparation was allowed to cool at 25° C. for at least 30 minutes. Measured the weight of weigh boat, where the weight of the perfume is determined by the difference in the weight. A drawing of the structure of a particle in this low-water composition, is shown in FIG. 8.

TABLE 4

| | Sample BA (inventive) | Sample BB (inventive) | Sample BC (inventive) | Sample BD (inventive) |
|---|---|---|---|---|
| Preparation SDC | | | | |
| 1) Water | 60.92 g | 60.92 g | 27.011 g | 30.873 g |
| 2) NaC8 | — | — | — | — |
| 3) NaC10 | 10.01 g | 10.01 g | 3.757 g | — |
| 4) NaC12 | 15.007 g | 15.007 g | 8.750 g | 12.500 g |
| 5) Perfume capsules (melamine formaldehyde) | 15.30 g | 15.30 g | — | — |
| 6) Perfume capsules (POLY-ACRYLATE) | — | — | 10.497 g | 6.676 g |
| 11) Perfume | — | — | — | — |
| % Freshness Agent (dry) | 16.0% | 16.0% | 15.0% | 10.1% |
| % Slow CA | 60.0% | 60.0% | 70.0% | — |
| Preparation PEGC | | | | |
| 7) PEG 6,000 | — | — | — | — |
| 8) PEG 8,000 | 25.000 g | 25.000 g | 25.000 g | — |
| 9) PEG 9,000 | — | — | — | 8.640 g |
| 10) PEG 10,000 | — | — | — | — |
| 5) Perfume capsules (melamine formaldehyde) | — | — | — | — |
| 6) Perfume capsules (POLY-ACRYLATE) | — | — | — | — |
| 11) Perfume | — | — | — | 3.448 g |
| % Freshness Agent | — | — | — | 28.5% |
| Low-water composition | | | | |
| SDC domain | 0.0082 g | 0.0099 g | 0.2883 g | 0.0119 g |

TABLE 4-continued

| | Sample BA (inventive) | Sample BB (inventive) | Sample BC (inventive) | Sample BD (inventive) |
|---|---|---|---|---|
| PEGC domain | 0.0074 g | 0.0046 g | 0.1476 g | 0.0109 g |
| % CA | 44.7% | 57.4% | 56.2% | 47.0% |
| % Perfume Capsules | 8.4% | 10.9% | 9.9% | 5.3% |
| % Perfume | — | — | — | 13.6% |
| % PEG | 47.4% | 31.7% | 33.9% | 34.2% |
| % Water | | | | |
| Ave. Mass | 15.6 mg | 14.5 mg | 435.9 mg | 22.8 mg |

TABLE 5

| | Sample BE (inventive) | Sample BF (inventive) | Sample BG (inventive) |
|---|---|---|---|
| Preparation SDC | | | |
| 1) Water | 34.726 g | 28.331 g | 30.372 g |
| 2) NaC8 | — | — | — |
| 3) NaC10 | 10.000 g | 7.554 g | 3.750 g |
| 4) NaC12 | — | 7.511 g | 8.752 g |
| 5) Perfume capsules (melamine formaldehyde) | — | | 7.139 g |
| 6) Perfume capsules (polyacrylate) | 5.296 g | 6.671 g | — |
| 11) Perfume | — | — | — |
| % Freshness Agent (dry) | 10.0% | 8.5% | 15.0% |
| % Slow CA | — | 50.0% | 70.0% |
| Preparation PEGC | | | |
| 7) PEG 6,000 | — | — | — |
| 8) PEG 8,000 | — | 25.000 g | 25.000 g |
| 9) PEG 9,000 | 8.640 g | — | — |
| 10) PEG 10,000 | — | — | — |
| 5) Perfume capsules (melamine formaldehyde) | — | — | — |
| 6) Perfume capsules (POLYACRYLATE) | — | — | — |
| 11) Perfume | 3.448 g | — | — |
| % Freshness Agent | 28.5% | — | — |
| Low-water composition | | | |
| SDC domain | 0.0101 g | 0.0157 g | 0.0092 g |
| PEGC domain | 0.0159 g | 0.1300 g | 0.1294 g |
| % CA | 35.0% | 9.8% | 5.6% |
| % Perfume Capsules | 3.9% | 0.9% | 1.0% |
| % Perfume | 17.4% | — | — |
| % PEG | 43.7% | 89.2% | 93.4% |
| % Water | — | — | — |
| Ave. Mass | 26.0 mg | 145.7 mg | 138.6 mg |

TABLE 6

| | Sample BH (inventive) | Sample BI (inventive) |
|---|---|---|
| Preparation SDC | | |
| 1) Water | 37.380 g | 35.721 g |
| 2) NaC8 | — | — |
| 3) NaC10 | 5.0066 g | 5.0060 g |
| 4) NaC12 | 7.5010 g | 7.5136 g |
| 5) Perfume capsules (melamine formaldehyde) | — | — |
| 6) Perfume capsules (POLYACRYLATE) | — | — |
| 11) Perfume | 0.130 g | 1.8096 g |
| % Freshness Agent (dry) | 1.0% | 12.6% |
| % Slow CA | 60.0% | 60.0% |
| Preparation PEGC | | |
| 7) PEG 6,000 | — | — |
| 8) PEG 8,000 | 13.090 g | 13.090 g |
| 9) PEG 9,000 | — | — |
| 10) PEG 10,000 | — | — |
| 5) Perfume capsules (melamine formaldehyde) | — | — |
| 6) Perfume capsules (POLYACRYLATE) | 0.668 g | 0.668 g |
| 11) Perfume | — | — |
| % Freshness Agent | 1.5% | |
| Low-water composition | | |
| SDC | 0.0119 g | 0.0119 g |
| PEGC | 0.0737 g | 0.0427 g |
| % CA | 13.8% | 19.0% |
| % Perfume Capsules | 1.3% | 0.5% |
| % Perfume | 0.1% | 2.8% |
| % PEG | 79.9% | 75.6% |
| % Water | 4.9% | 1.9% |
| Ave. Mass | 85.6 mg | 54.6 mg |

EXAMPLE 3

EXAMPLE 3 demonstrates particles composed of two or more domains in which the particles have a core of a PEGC domain and sprinkled with SDC domains (FIG. 9)

Such particles offer the opportunity—for example, for particles with significant amounts of PEGC and SDC domains, with the dissolution properties of each domain independently. In the non-limiting Sample CA and Sample CB, the perfume capsules are put in the SDC domain and released into the wash cycle at a rate consistent with the composition of the blend of the crystallizing agents, and the neat perfumes are put into the PEGC domains and released into the wash cycle at a rate consistent with the molecular weight of the PEG. The solubility percent as determined by the DISSOLUTION TEST METHOD is now independent of the different domains in contrast to the particles described, for example, in Example 1. Also, such a form becomes aesthetically advantageous to consumer with the affixed domains signal different functionality in the particles. Further, such forms are easy to commercially prepare by—for example, passing a warm PEGC domain through a 'sprinkling' of SDC domain particles, which can stick to the surface of the domain.

Preparation of SDC Domains

Mixing—a 250-ml stainless steel beaker (Thermo Fischer Scientific, Waltham, MA.) was placed on a hot plate (VWR, Radnor, PA, 7×7 CER Hotplate, cat. no. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the preparation. The heater was set at 80° C., the impeller was set to rotate at 250 rpm and the composition was heated to 80° C. or until all the crystallizing agent was solubilized and the composition was clear. The preparation was then poured into a Max 100 Mid Cup (Speed Mixer), capped, and allowed to cool to 25° C. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes.

Forming—the preparation was poured onto an aluminum foil to an even thickness of about 1 mm. The preparation was then placed in a refrigerator (VWR Door Solid Lock F Refrigerator 115V, 76300-508, or equivalent) equilibrated to 4° C. for 8 hours to crystallize the crystallizing agent.

Drying—they were placed in a convection oven (Yamato, DKN400, or equivalent) set at 25° C. for another 8 hours to pass a steady stream of air to dry the composition. The final SDC was confirmed to be less than 10% moisture by the MOISTURE TEST METHOD. The flat sheet was broken into coarsely pieces on the order of 1-mm×1-mm in size.

Preparation of PEGC Domains

Separately, a 250-ml stainless steel beaker (Thermo Fischer Scientific, Waltham, MA.) was placed on a hot plate (VWR, Radnor, PA, 7×7CER Hotplate, cat. no. NO97042-690). PEG (Material 8-11) was added to the beaker. A mixing device comprising an overhead mixer (IKA Works Inc, Wilmington, NC, model RW20 DMZ) and a three-blade impeller design was assembled, with the impeller placed in the preparation. A temperature probe was also placed into preparation. The impeller was set to rotate at 250 rpm. The preparation was heated to 100° C. until the PEG melted completely. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes. The preparation was used to make the low-water composition within 5 minutes of reaching the final temperature.

Preparation of Low-Water Compositions

A small amount of the of the PEGC was placed in a weigh boat and weighed. Before significant crystallization (within 30 seconds), a small amount of SDC was gently sprinkled on the PEGC. The small-size SDC domain stuck to the surface of the PEGC domain as the material crystallized. The preparation was allowed to cool at 25° C. for at least 30 minutes. The resulting particle is removed from the mold and reweighed to determine the associate amount of SDC. A drawing of the structure of a particle in this low-water composition, is shown in FIG. 9.

TABLE 7

| | Sample CA (inventive) | Sample CB (inventive) |
|---|---|---|
| Preparation SDC | | |
| 1) Water | 59.878 g | 59.878 g |
| 2) NaC8 | — | — |
| 3) NaC10 | 10.004 g | 10.004 g |
| 4) NaC12 | 15.006 g | 15.006 g |
| 5) Perfume capsules (MELAMINE FORMALDEHYDE) | 15.131 g | 15.131 g |
| 6) Perfume capsules (POLYACRYLATE) | — | — |
| 11) Perfume | — | — |
| % Freshness Agent (dry) | 15.8% | 15.8% |
| % Slow CA | 60.0% | 60.0% |
| Preparation PEGC | | |
| 7) PEG 6,000 | 40.009 g | — |
| 8) PEG 8,000 | — | — |
| 9) PEG 9,000 | — | — |
| 10) PEG 10,000 | — | 40.005 g |
| 5) Perfume capsules (melamine formaldehyde) | — | — |
| 6) Perfume capsules (POLYACRYLATE) | — | — |
| 11) Perfume | 10.008 g | 10.007 g |
| % Freshness Agent | 20.0% | 20.0% |
| Low-water composition | | |
| SDC domain | 0.0136 g | 0.0453 g |
| PEGC domain | 0.0874 g | 0.1816 g |
| % CA | 11.3% | 16.8% |
| % Perfume Capsules | 2.1% | 3.1% |
| % Perfume | 17.3% | 16.0% |
| % PEG | 69.2% | 64.0% |
| % Water | — | — |
| Ave. Mass | 10.1 mg | 22.7 mg |

EXAMPLE 4

EXAMPLE 4 demonstrates particles composed of two or more domains in which the particle has one side containing PEGC domain and one side containing SDC domain (FIG. 10).

Such particles also offer the opportunity—for example, for particles with significant amounts of PEGC and SDC domains, with the dissolution properties of each domain independently. In the non-limiting example of Sample DA and Sample DB, the perfume capsules are put in the SDC domain and released into the wash cycle at a rate consistent with the composition of the blend of the crystallizing agents, and the neat perfumes are put into the PEGC domains and released into the wash cycle at a rate consistent with the molecular weight of the PEG. The solubility percent as determined by the DISSOLUTION TEST METHOD is now independent of the different domains in contrast to the particles described, for example, in Example 1. Further, such a form places no limits on the absolute amount of SDC and PEGC domains, in the particle relative to EXAMPLE 3.

Preparation of SDC Domains

Mixing—a 250-ml stainless steel beaker (Thermo Fischer Scientific, Waltham, MA.) was placed on a hot plate (VWR, Radnor, PA, 7×7 CER Hotplate, cat. No. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the preparation. The heater was set at 80° C., the impeller was set to rotate at 250 rpm and the composition was heated to 80° C. or until all the crystallizing agent was solubilized and the composition was clear. The preparation was then poured into a Max 100 Mid Cup (Speed Mixer), capped, and allowed to cool to 25° C. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes.

Forming—the preparation was transferred to polymer mold patterned with 5-mm diameter hemispheres. The preparation was then placed in a refrigerator (VWR Door Solid Lock F Refrigerator 115V, 76300-508, or equivalent) equilibrated to 4° C. for 8 hours to crystallize the crystallizing agent.

Drying—they were placed in a convection oven (Yamato, DKN400, or equivalent) set at 25° C. for another 8 hours to pass a steady stream of air to dry the composition. The preparation was removed from the molds when completely dry. The final SDC was confirmed to be less than 10% moisture by the MOISTURE TEST METHOD.

Preparation of PEGC Domains

Separately, a 250-ml stainless steel beaker (Thermo Fischer Scientific, Waltham, MA.) was placed on a hot plate (VWR, Radnor, PA, 7×7 CER Hotplate, cat. no. NO97042-690). PEG (Material 8-11) was added to the beaker. A mixing device comprising an overhead mixer (IKA Works Inc, Wilmington, NC, model RW20 DMZ) and a three-blade impeller design was assembled, with the impeller placed in the preparation. A temperature probe was also placed into preparation. The impeller was set to rotate at 250 rpm. The preparation was heated to 100° C. until the PEG melted completely. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes. The preparation was used to make the low-water composition within 5 minutes of reaching the final temperature. The preparation was transferred to polymer mold patterned with 5-mm diameter hemispheres.

Preparation of Low-Water Compositions

Within 30 seconds of placement of the preparation in the mold, a domain of SDC was placed on the liquid PEGC, such that the flat side of the SDC was placed on the flat side of the PEGC. The preparation was allowed to cool at 25° C. for at least 30 minutes. The low-water composition was removed from the mold after complete cooling. The two domains were affixed, and the resulting particle was spherical in shape as illustrated in FIG. 10.

TABLE 8

| | Sample DA (inventive) | Sample DB (inventive) |
|---|---|---|
| Preparation SDC | | |
| 1) Water | 59.878 g | 59.787 g |
| 2) NaC8 | — | — |
| 3) NaC10 | 10.004 g | 10.004 g |
| 4) NaC12 | 15.006 g | 15.006 g |
| 5) Perfume capsules (MELAMINE FORMALDEHYDE) | 15.131 g | 15.131 g |
| 6) Perfume capsules (POLYACRYLATE) | — | — |
| 11) Perfume | — | — |
| % Freshness Agent (dry) | 15.8% | 15.8% |
| % Slow CA | 60.0% | 60.0% |
| Preparation PEGC | | |
| 7) PEG 6,000 | 40.009 g | — |
| 8) PEG 8,000 | — | — |
| 9) PEG 9,000 | — | — |

TABLE 8-continued

| | Sample DA (inventive) | Sample DB (inventive) |
|---|---|---|
| 10) PEG 10,000 | — | 40.005 g |
| 5) Perfume capsules (MELAMINE FORMALDEHYDE) | — | — |
| 6) Perfume capsules (POLYACRYLATE) | — | — |
| 11) Perfume | 10.008 g | 10.007 g |
| % Freshness Agent | 20.0% | 20.0% |
| Low-water composition | | |
| SDC domain | 0.0077 g | 0.0080 g |
| PEGC domain | 0.0280 g | 0.0457 g |
| % CA | 18.2% | 12.5% |
| % Perfume Capsules | 3.4% | 2.4% |
| % Perfume | 15.7% | 17.0% |
| % PEG | 62.7% | 68.0% |
| % Water | — | — |
| Ave. Mass | 35.7 mg | 53.7 mg |

EXAMPLE 5

EXAMPLE 5 demonstrates low-water composition composed of two or more different particles, where the particles may contain combinations of SDC and PEGC domains as described in previous example or may contain only single SDC and PEGC domains with freshness benefit agents. These non-limiting examples, describe the later; however, it is understood such physical blends of particles to create a low-water composition may also include the former.

Particle composition Sample EA—Sample EH (TABLE 9 and TABLE 10) represent viable particle compositions, containing a single SDC or PEGC domain. Sample EI-Sample EQ (TABLE 11 and TABLE 12) represent inventive low-water compositions composed of the particle compositions. The type and quantity of the particles in the low-water composition is expressed as "Dosage of the composition", or typical quantity of used in a single wash by a consumer. Numerous considerations are important in deciding dosage including the amount of "Perfume capsules in wash" and the amount of "Neat Perfume in wash" added by the dosage; however, other factors such as the selection of the composition of the SDC or PEGC domains also important to delivering the level of freshness benefit. For example, a consumer might prefer either exceptionally long-lasting freshness on dry fabrics which may would require dose of about 5-10 grams of perfume capsules in the wash or alternatively a consumer might prefer just an initial burst of freshness on rubbing which may would require dose of about 0.5-2 grams of perfume capsules in the wash. For example, a consumer might prefer exceptionally 'flash' of freshness on removing wet fabrics from the wash which may require about 5-10 grams of neat perfume or a consumer might prefer subtle, pleasant linger of freshness on removing wet fabrics from the wash which may require only about 1-2 grams of neat perfume in the wash. These freshness profiles are further influenced by the dissolution rates of the domains, containing the freshness benefit agents. Finally, the selection of the particles the comprise the low-water composition is also influenced by commercial considerations. It is often more commercially-viable to create two types of particles and physically mix at different ratios to enable compositions reach all the consumer preferences, rather than a special process for each consumer. This is often termed 'late product differentiation'. Some consumers may prefer a dose that contains a large, capful of the composition on the order of about 50-100 grams while some e-consumers or sustainability-minded consumers may prefer a more-concentrated and compact dose of about 10-20 grams. Net, these examples provide a range of freshness performance and commercial opportunities.

TABLE 9

| | Sample EA (particle) | Sample EB (particle) | Sample EC (particle) | Sample ED (particle) |
|---|---|---|---|---|
| SDC Domains | | | | |
| 2) NaC8 | — | — | 20 g | — |
| 3) NaC10 | 30.0 g | 40 g | — | 40 g |
| 4) NaC12 | 70.0 g | 60 g | 80 g | 60 g |
| Perfume capsules (MELAMINE FORMALDEHYDE)* | 18.0 g | — | 15 g | — |
| Perfume capsules (POLYACRYLATE)* | — | 18.0 g | — | — |
| % Perfume capsules (dry) | 15.3% | 15.3% | 12.0% | — |
| 11) Perfume | — | — | 10.0 g | 10.0 g |
| % Perfume (dry) | — | — | 8.0% | 9.1% |
| % Slow CA | 70.0% | 60.0% | — | 60.0% |
| PEGC Domains | | | | |
| 7) PEG 6,000 | — | — | — | — |
| 8) PEG 8,000 | — | — | — | — |
| 9) PEG 9,000 | — | — | — | — |
| 10) PEG 10,000 | — | — | — | — |
| Perfume capsules (MELAMINE FORMALDEHYDE)* | — | — | — | — |
| Perfume capsules (POLYACRYLATE)* | — | — | — | — |
| % Perfume capsules (dry) | — | — | — | — |
| 11) Perfume | — | — | — | — |
| % Perfume (dry) | — | — | — | — |

*Prepared from perfume capsule slurries material 5 and 6.

TABLE 10

| | Sample EE (particle) | Sample EF (particle) | Sample EG (particle) | Sample EH (particle) |
|---|---|---|---|---|
| SDC Domains | | | | |
| 2) NaC8 | — | — | — | — |
| 3) NaC10 | — | — | — | — |
| 4) NaC12 | — | — | — | — |
| Perfume capsules (MELAMINE FORMALDEHYDE)* | — | — | — | — |
| Perfume capsules (POLYACRYLATE)* | — | — | — | — |
| % Perfume capsules (dry) | — | — | — | — |
| 11) Perfume | — | — | — | — |
| % Perfume (dry) | — | — | — | — |
| % Slow CA | — | — | — | — |
| PEGC Domains | | | | |
| 7) PEG 6,000 | — | — | 100 g | — |
| 8) PEG 8,000 | 100 g | — | — | — |
| 9) PEG 9,000 | — | — | — | 100 g |
| 10) PEG 10,000 | — | 100 g | — | — |
| Perfume capsules (MELAMINE FORMALDEHYDE)* | 1.2 g | | — | 1.2 g |
| Perfume capsules (POLYACRYLATE)* | — | 1.2 g | — | — |
| % Perfume capsules (dry) | 1.2% | 1.2% | — | 1.1% |
| 11) Perfume | — | — | 20 g | 7.0 g |
| % Perfume (dry) | — | — | 16.7% | 6.5% |

*Prepared from perfume capsule slurries material 5 and 6.

TABLE 11

| | Sample EI (inventive) | Sample EJ (inventive) | Sample EK (inventive) | Sample EL (inventive) |
|---|---|---|---|---|
| Preparation low-water composition | | | | |
| SDC particles | Sample EA @ 49.0 g | Sample EB @ 49.0 g | Sample ED @ 50 g | Sample EC @ 10 g |
| PEGC particles | Sample EG @ 6.0 g | Sample EG @ 48.0 g | Sample EE @ 75 g | Sample EH @ 10 g |
| Dosage of the composition | 55.0 g | 97.0 g | 125.0 g | 20.0 g |
| Perfume capsules in wash | 7.5 g | 7.5 g | 0.9 g | 1.3 g |
| Neat Perfume in wash | 1.0 g | 8.0 g | 4.6 g | 0.9 g |

TABLE 12

| | Sample EM (inventive) | Sample EN (inventive) | Sample EO (inventive) | Sample EQ (inventive) |
|---|---|---|---|---|
| Preparation low-water composition | | | | |
| SDC particles | Sample EC @ 30.0 g | — | Sample EB @ 15 g | Sample EC @ 50 g |
| PEGC particles | Sample EF @ 30.0 g | Sample EA @ 15.0 g | — | — |
| Composite Particle (Example 1-Example 4) | — | Sample AH @ 20.0 g | Sample BD @ 15 g | Sample CA @ 40 g |
| Dosage of the composition | 60.0 g | 35.0 g | 30.0 g | 90.0 g |
| Perfume capsules in wash | 4.0 g | 3.6 g | 3.1 g | 6.8 g |
| Neat Perfume in wash | 2.4 g | 2.8 g | 4.0 g | 10.9 g |

EXAMPLE 6

EXAMPLE 6 suggests compositions prepared from particular blends of fatty acid materials which are neutralized into SDC compositions and blended with PEGC compositions to create a solid dissolvable compositions in which the SDC (e.g., FIG. 4A, FIG. 4B and FIG. 4C) and PEGC domains have different dissolution rate profiles allow different sequencing of the actives within each domain at particular times in the wash cycle. The dissolution rate of the SDC is influenced by the percentage of slow crystallizing agent (% slow CA) where those with higher levels (e.g., Sample EU) dissolve slower than those with lower levels (e.g., Sample ER). The absolute dissolution rate at different temperature is determined by the DISSOLUTION TEST METHOD. The dissolution rate of the PEGC is influenced by the molecular weight of the PEG, such that Sample ER (e.g., PEG 10,000) dissolves slower than Sample ES (e.g., PEG 8,000) which dissolves slower than Sample ET and Sample EU (e.g., PEG 6,000). The absolute dissolution rate at different temperature is determined by the DISSOLUTION TEST METHOD.

Preparation of SDC Domains

Mixing—a 250-ml stainless steel beaker (Thermo Fischer Scientific, Waltham, MA.) was placed on a hot plate (VWR, Radnor, PA, 7×7 CER Hotplate, cat. no. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the preparation. The heater was set at 80° C., the impeller was set to rotate at 250 rpm and the composition was heated to 80° C. or until all the crystallizing agent was solubilized and the composition was clear.

Forming—the preparation was then poured into a Max 100 Mid Cup (Speed Mixer), capped, and allowed to cool to 25° C. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes. In a non-limiting example, the preparation was transferred to polymer mold patterned with 5-mm diameter hemispheres. In another non-limiting example, the preparation was sprayed through an orifice to create small droplets. The size and shape of the DSC domains is formed to meet the final structure of the final low-water composition (e.g., FIG. 7, FIG. 8, FIG. 9, and FIG. 10). The preparation was then placed in a refrigerator (VWR Door Solid Lock F Refrigerator 115V, 76300-508, or equivalent) equilibrated to 4° C. for 8 hours to crystallize the crystallizing agent.

Drying—the preparations were placed in a convection oven (Yamato, DKN400, or equivalent) set at 25° C. for another 8 hours to pass a steady stream of air to dry the composition. The preparation was removed from the molds when completely dry. The final SDC was confirmed to be less than 10% moisture by the MOISTURE TEST METHOD.

Preparation of PEGC Domains

Separately, a 250-ml stainless steel beaker (Thermo Fischer Scientific, Waltham, MA.) was placed on a hot plate (VWR, Radnor, PA, 7×7 CER Hotplate, cat. no. NO97042-690). PEG (Material 8-11) was added to the beaker. A mixing device comprising an overhead mixer (IKA Works Inc, Wilmington, NC, model RW20 DMZ) and a three-blade impeller design was assembled, with the impeller placed in the preparation. A temperature probe was also placed into preparation. The impeller was set to rotate at 250 rpm. The preparation was heated to 100° C. until the PEG melted completely. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes. In a non-limiting example, the preparation was used to make the low-water composition within 5 minutes of reaching the final temperature. In a non-limiting example, the preparation was transferred to polymer mold patterned with 5-mm diameter hemispheres.

The size and shape of the DSC domains is formed to meet the final structure of the final low-water composition (e.g., FIG. 7, FIG. 8, FIG. 9, and FIG. 10).

Preparation of Low-Water Compositions

Sample ER (5 mg)-SDC composition is sprayed as small drops onto a flat sheet, crystallized, and dried. The PEGC is sprayed onto a flat sheet and crystallized. The two flat ends are combined to create a low-water composition particle (e.g., FIG. 10). Sample ES (5 mg)—SDC composition is sprayed as small drops onto a flat sheet, crystallized, and dried. The PEGC is sprayed onto the surface of the SDC composition and crystallized. The low-water composition is a coated particle (e.g., FIG. 8). Sample ET (500 mg)—PEGC composition is placed as large drops onto a flat sheet, crystallized, and dried. The SDC is sprayed to create a fine granule, which adheres to the surface of the large drop. The low-water composition is a sugary-gum-drop-like particle (e.g., FIG. 9). Sample EU (500 mg)—SDC composition is spray dried small particles. The small SDC particles are added to the PEGC melt, and a large drop is placed on a flat surface and crystallized. The low-water composition encapsulates the SDC (e.g., FIG. 7).

In a non-limiting case, a final low-water composition for a wash treatment, may contain particles inclusive of one of a combination of multiple particle described in Sample ER, Sample ES, Sample ET, and Sample EU.

TABLE 13

| | Sample ER (inventive) | Sample ES (inventive) | Sample ET (inventive) | Sample EU (inventive) |
|---|---|---|---|---|
| Preparation SDC | | | | |
| 1) Water | 445 g | 447 g | 522 g | 231 g |
| 12) C8C10L | 114 g | 91 g | 91 g | 66 g |
| 13) Lauric Acid | 117 g | 141 g | 141 g | 158 g |
| 14) NaOH | 105 g | 103 g | 103 g | 97 g |
| (15) Perfume capsules | 219 g | — | — | — |
| (16) Perfume capsules | — | 219 g | — | — |
| (17) Perfume capsules | — | — | 144 g | — |
| (18) Perfume capsules | — | — | — | 448 g |
| % Slow CA | 50.0% | 60% | 60% | 70% |
| Preparation PEGC | | | | |
| 7) PEG 6,000 | — | — | 693 g | 90 g |
| 8) PEG 8,000 | — | 393 g | — | — |
| 9) PEG 9,000 | — | — | — | — |
| 10) PEG 10,000 | 103 g | — | — | — |
| 11) Perfume | 40 g | 40 g | 40 g | 20 g |
| Low-water composition | | | | |
| SDC domain | 2.70 mg | 1.39 mg | 92.78 mg | 322.50 mg |
| PEGC domain | 2.30 mg | 3.61 mg | 407.22 mg | 177.50 mg |
| | FIG. 10 | FIG. 8 | FIG. 9 | FIG. 7 |
| % CA | 45.8 | 23.7% | 15.8% | 58.1% |
| % Perfume capsules | 8.1% | 4.2% | 2.8% | 6.5% |
| % Perfume | 12.9% | 6.7% | 4.4% | 6.5% |
| % PEG | 33.2% | 65.5% | 77.0% | 29.0% |
| Ave. Mass | 5.00 mg | 5.00 mg | 500 mg | 500 mg |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A low-water composition, comprising:

1) At least one solid dissolvable composition domain (SDC) having crystallizing agent;

2) at least one polyethylene glycol (PEGC) domain;

3) Freshness benefit agent; and wherein the crystallizing agent is the sodium salt of saturated fatty acids having from 8 to about 12 carbon atoms;

wherein the freshness benefit agent is present in at least one of the SDC or PEGC;

wherein the low water composition has a water content of less than about 10 wt. %"; and wherein the sodium salt of saturated fatty acids of the crystallizing agent comprises from 50 wt. % to 70 wt. % C12, 15 wt. % to 25 wt. % C10, and 15 wt. % to 25 wt. % C8.

2. The low-water composition of claim 1, wherein the sodium salt of saturated fatty acids comprises between 50% and 70% percent slow crystallizing agent (% slow CA).

3. The low-water composition of claim 1, wherein the crystallizing agent in the SDC domain is in the form of fiber, as determined by the FIBERS TEST METHOD.

4. The low-water composition of claim 1, wherein the amount of water is less than 10 wt. % of the final low-water composition as determined by the MOISTURE TEST METHOD.

5. The low-water composition of claim 1, where the freshness benefit agent is at least one of a perfume or a malodor counteractant.

6. The low-water composition of claim 5, where the freshness benefit agent is a neat perfume.

7. The low-water composition of claim 5, where the freshness benefit agent is at least one of 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylpropanal, and 2,6-dimethyl-5-heptenal, alpha-damascone, beta-damascone, gamma-damascone, beta-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl)propyl] cyclopentan-2-one, 2-sec-butylcyclohexanone, and beta-dihydro ionone, linalool, ethyllinalool, tetrahydrolinalool, dihydromyrcenol, or mixtures thereof.

8. The low-water composition of claim 5, where the perfume is encapsulated in a capsule having a wall and a core.

9. The low-water composition of claim 8, where the capsule wall comprises at least one of melamine, polyacrylamide, silicones, silica, polystyrene, polyurea, polyurethanes, polyacrylate based materials, polyacrylate esters based materials, gelatin, styrene malic anhydride, polyamides, aromatic alcohols, polyvinyl alcohol or mixtures thereof.

10. The low-water composition of claim 8, where the freshness benefit agent is a mixture of a neat perfume and perfume capsules.

11. The low-water composition of claim 5, wherein the perfume is present in an amount of 1 wt % to 40 wt %, based on the total weight of the low-water composition.

12. The low-water composition of claim 8, wherein the perfume capsules are present in an amount of from about 0.05% to about 20%, by weight of the composition.

13. The low-water composition of claim 1 wherein the sodium salt is at least one of sodium C8, sodium C10, or sodium C12.

14. The low-water composition of claim 1 wherein the crystallizing agent is present in an amount from about 70% to about 95% by weight of the low-water composition.

15. The low-water composition of claim 6, wherein the neat perfume comprises between about 0.01 wt % to about 25 wt %, based on the total weight of the low-water composition.

16. The low-water composition of claim 1, wherein the PEGC comprises PEG with molecular weight is from about from about 200 to about 50,000 Daltons.

17. The low-water composition of claim 1, wherein in the low-water composition is comprised of particles.

18. The low-water composition of claim 17, composed of physical mixtures of particles, one composed of SDC domains, and one composed of PEGC domains.

* * * * *